(12) United States Patent
Hirose et al.

(10) Patent No.: US 9,225,014 B2
(45) Date of Patent: *Dec. 29, 2015

(54) BATTERY, NEGATIVE ELECTRODE ACTIVE MATERIAL, AND ELECTRIC TOOL

(71) Applicant: Sony Corporation, Tokyo (JP)

(72) Inventors: Takakazu Hirose, Fukushima (JP); Kenichi Kawase, Fukushima (JP); Takashi Fujinaga, Fukushima (JP); Isao Koizumi, Fukushima (JP); Toshio Nishi, Fukushima (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/726,811

(22) Filed: Jun. 1, 2015

(65) Prior Publication Data

US 2015/0263344 A1    Sep. 17, 2015

Related U.S. Application Data

(63) Continuation of application No. 13/526,133, filed on Jun. 18, 2012, now Pat. No. 9,048,485.

(30) Foreign Application Priority Data

Jun. 24, 2011    (JP) .................................. 2011-141005

(51) Int. Cl.
*H01M 4/38*    (2006.01)
*H01M 4/48*    (2010.01)
(Continued)

(52) U.S. Cl.
CPC .............. *H01M 4/366* (2013.01); *H01M 4/525* (2013.01); *H01M 4/583* (2013.01); *H01M 2004/021* (2013.01); *H01M 2004/027* (2013.01); *H01M 2220/30* (2013.01)

(58) Field of Classification Search
CPC .......... H01M 4/38; H01M 4/386; H01M 4/48
See application file for complete search history.

(56) References Cited

U.S. PATENT DOCUMENTS 6,005,489 A   12/1999   Siegle et al.
6,331,365 B1  12/2001   King
(Continued)

FOREIGN PATENT DOCUMENTS

JP        2997741        1/2000
JP     2001-185127       7/2001
(Continued)

OTHER PUBLICATIONS

Office Action issued in connection with Japanese Patent Application No. 2011-141005, dated Mar. 4, 2015. (5 pages).
(Continued)

*Primary Examiner* — Kenneth Douyette
(74) *Attorney, Agent, or Firm* — K&L Gates LLP

(57) ABSTRACT

A battery is provided including a positive electrode; a negative electrode including a first negative electrode active material; and an electrolytic solution, wherein the first negative electrode active material includes a core portion having a core portion surface, wherein the core portion has a median diameter of 0.3 μm to 20 μm, and a covering portion that covers at least part of the core portion surface, wherein the covering portion comprises at least Si, O and at least of one element M1 selected from Li, carbon (C), Mg, Al, Ca, Ti, Cr, Mn, Fe, Co, Ni, Cu, Ge, Zr, Mo, Ag, Sn, Ba, W, Ta, Na, and K.

27 Claims, 11 Drawing Sheets

(51) Int. Cl.
  *H01M 4/36* (2006.01)
  *H01M 4/525* (2010.01)
  *H01M 4/583* (2010.01)
  *H01M 4/02* (2006.01)

(56) References Cited

U.S. PATENT DOCUMENTS

| | | | |
|---|---|---|---|
| 2003/0175589 A1 | 9/2003 | Kaminaka et al. | |
| 2005/0031780 A1 | 2/2005 | Matsui | |
| 2005/0233213 A1 | 10/2005 | Lee et al. | |
| 2009/0077794 A1 | 3/2009 | Hirakawa et al. | |
| 2009/0162750 A1 | 6/2009 | Kawakami et al. | |
| 2010/0021820 A1* | 1/2010 | Ishii | 429/231.8 |

FOREIGN PATENT DOCUMENTS

| | | |
|---|---|---|
| JP | 2002-042806 | 2/2002 |
| JP | 2002-170561 | 6/2002 |
| JP | 2003-160328 | 6/2003 |
| JP | 2003-272613 | 9/2003 |
| JP | 2005-085717 | 3/2005 |
| JP | 2005-183264 | 7/2005 |
| JP | 2005-243640 | 9/2005 |
| JP | 2005-340223 | 12/2005 |
| JP | 2006-114454 | 4/2006 |
| JP | 2006-164954 | 6/2006 |
| JP | 2007-234255 | 9/2007 |
| JP | 2008-177346 | 7/2008 |
| JP | 2008-199767 | 8/2008 |
| JP | 2008-251369 | 10/2008 |
| JP | 2008-282819 | 11/2008 |
| JP | 2009-503786 | 1/2009 |
| JP | 2009-070825 | 4/2009 |
| JP | 2009-076373 | 4/2009 |
| JP | 2009-104892 | 5/2009 |
| JP | 2009-164104 | 7/2009 |
| JP | 2009-205950 | 9/2009 |
| JP | 2009-212074 | 9/2009 |
| JP | 2010-140901 | 6/2010 |
| JP | 2011-109824 | 6/2011 |
| WO | 2007-010922 | 1/2007 |

OTHER PUBLICATIONS

Notification of the First Office Action issued in connection with Chinese Patent Application No. 201210203703.5, dated Jul. 22, 2015. (21 pages).

* cited by examiner

BATTERY, NEGATIVE ELECTRODE ACTIVE MATERIAL, AND ELECTRIC TOOL

CROSS REFERENCES TO RELATED APPLICATIONS

The present application is a continuation of U.S. patent application Ser. No. 13/526,133, filed on Jun. 18, 2012, now U.S. Pat. No. 9,048,485, which claims priority to Japanese Priority Patent Application JP 2011-141005 filed in the Japan Patent Office on Jun. 24, 2011, the entire content of which is hereby incorporated by reference.

BACKGROUND

The present application relates to a negative electrode for a lithium-ion secondary battery, the negative electrode containing a negative-electrode active material capable of occluding and releasing lithium ions, a lithium-ion secondary battery including the negative electrode, a battery pack, an electric vehicle, a power storage system, an electric tool, and an electronic device, which include the secondary battery.

In recent years, electronic devices typified by, for example, cellular phones and personal digital assistants (PDAs) have been widely used. Further size and weight reduction and longer life of electronic devices have been strongly demanded. Thus, there have been advances in the development of batteries serving as power sources, in particular, small and lightweight secondary batteries having a high energy density. Recently, various applications of secondary batteries to, for example, battery packs, electric vehicles, such as electric automobiles, power storage systems, such as power servers for household use, and electric tools, such as electric drills, as well as electronic devices described above have been studied.

Secondary batteries using various charge-discharge principles have been reported. In particular, lithium-ion secondary batteries that utilize the occlusion and release of lithium ions hold great promise because they have higher energy densities than lead-acid batteries, nickel-cadmium batteries, and other batteries.

A lithium-ion secondary battery includes a positive electrode, a negative electrode, and an electrolytic solution. The negative electrode contains a negative-electrode active material capable of occluding and releasing lithium ions. As the negative-electrode active material, a carbon material, such as graphite, is widely used. Recently, secondary batteries have been required to have higher battery capacities. Thus, the use of Si has been studied. The theoretical capacity of Si (4199 mAh/g) is much higher than the theoretical capacity of graphite (372 mAh/g), so the battery capacity should be significantly improved.

However, the use of Si as a negative-electrode active material causes extreme expansion and contraction of the negative-electrode active material during charge and discharge, so that the negative-electrode active material is liable to be cracked mainly in the vicinity of its surface. When the negative-electrode active material is cracked, a high-reactive newly-formed surface (an active surface) is formed, thereby increasing the surface area (reactive area) of the negative-electrode active material. As a result, the decomposition reaction of an electrolytic solution occurs on the newly-formed surface. The electrolytic solution is consumed to form a coating film derived from the electrolytic solution on the newly-formed surface. Thus, battery characteristics, such as cycle characteristics, are liable to decrease.

Thus, in order to improve battery characteristics, such as cycle characteristics, various configurations of the lithium-ion secondary batteries have been studied.

Specifically, to improve cycle characteristics and safety, Si and amorphous $SiO_2$ are simultaneously deposited by a sputtering method (for example, see Japanese Unexamined Patent Application Publication No. 2001-185127). To obtain excellent battery capacity and safety performance, electron-conductive material layers (carbon material) are arranged on surfaces of $SiO_x$ particles (for example, see Japanese Unexamined Patent Application Publication No. 2002-042806). To improve high rate charge-discharge characteristics and cycle characteristics, a negative-electrode active material layer containing Si and O is formed in such a manner that the oxygen content is increased with decreasing distance from a negative-electrode collector (for example, see Japanese Unexamined Patent Application Publication No. 2006-164954). To improve cycle characteristics, a negative-electrode active material layer containing Si and O is formed in such a manner that the average oxygen content in the whole negative-electrode active material layer is 40 atomic percent or less and that the average oxygen content is increased with decreasing distance from a negative-electrode collector (for example, see Japanese Unexamined Patent Application Publication No. 2006-114454). In this case, a difference in average oxygen content between a portion near the negative-electrode collector and a portion remote from the negative-electrode collector is in the range of 4 atomic percent to 30 atomic percent.

To improve initial charge-discharge characteristics and the like, a nano-composite including a Si phase, $SiO_2$, and metal oxide $M_yO$ is used (for example, see Japanese Unexamined Patent Application Publication No. 2009-070825). To improve cycle characteristics, powdered $SiO_x$ ($0.8 \leq x \leq 1.5$, particle size range: 1 μm to 50 μm) and a carbonaceous material are mixed and fired at 800° C. to 1600° C. for 3 hours to 12 hours (for example, see Japanese Unexamined Patent Application Publication No. 2008-282819). To shorten an initial charge time, a negative-electrode active material expressed as $Li_aSiO_x$ ($0.5 \leq a-x \leq 1.1$ and $0.2 \leq x \leq 1.2$) is used (for example, see International Publication No. WO2007/010922). In this case, Li is deposited by evaporation on an active material precursor containing Si and O. To improve charge-discharge cycle characteristics, the composition of $SiO_x$ is controlled in such a manner that the molar ratio of the O content to the Si content of a negative-electrode active material is in the range of 0.1 to 1.2 and that a difference between the maximum value and the minimum value of the molar ratio of the O content to the Si content in the vicinity of a boundary between the negative-electrode active material and a current collector is 0.4 or less (for example, see Japanese Unexamined Patent Application Publication No. 2008-251369). To improve load characteristics, a Li-containing porous metal oxide ($Li_xSiO$: $2.1 \leq x \leq 4$) is used (for example, Japanese Unexamined Patent Application Publication No. 2008-177346).

To improve charge-discharge cycle characteristics, a hydrophobic layer of a silane compound, a siloxane compound, or the like is formed on a thin film containing Si (for example, see Japanese Unexamined Patent Application Publication No. 2007-234255). To improve cycle characteristics, a conductive powder in which surfaces of $SiO_x$ ($0.5 \leq x < 1.6$) particles are covered with graphite coating films is used (for example, see Japanese Unexamined Patent Application Publication No. 2009-212074). In this case, on Raman spectroscopy analysis, each graphite coating film develops broad peaks at 1330 $cm^{-1}$ and 1580 $cm^{-1}$ Raman shift, and an intensity ratio $I_{1330}/I_{1580}$ is $1.5<I_{1330}/I_{1580}<3$. To improve a battery capacity and cycle characteristics, a powder including 1% by mass to 30% by mass of particles is used, the particles each having a structure in which Si microcrystals (crystal size: 1 nm to 500 nm) are dispersed in $SiO_2$ (for example, see Japanese Unexamined Patent Application Publication No. 2009-205950). In this case, in a particle size distribution by a laser diffraction/scattering type particle size distribution measurement method, the 90% accumulated diameter (D90) of the power is 50 μm or less, and the particle diameters of the particles are less than 2 μm. To improve cycle characteristics, $SiO_x$ ($0.3 \leq x \leq 1.6$) is used, and an electrode unit is pressurized at a pressure of 3 $kgf/cm^2$ or more during charge and discharge (for example, see Japanese Unexamined Patent Application Publication No. 2009-076373). To improve overcharge characteristics, over-discharge characteristics, and the like, an oxide of silicon with a silicon-oxygen atomic ratio of 1:y ($0<y<2$) is used (for example, see Japanese Patent No. 2997741).

Furthermore, in order to electrochemically accumulate or release a large amount of lithium ions, an amorphous metal oxide is provided on surfaces of primary particles of Si or the like (for example, see Japanese Unexamined Patent Application Publication No. 2009-164104). The Gibbs free energy when the metal oxide is formed by oxidation of a metal is lower than the Gibbs free energy when Si or the like is oxidized. To achieve a high capacity, high efficiency, a high operating voltage, and long lifetime, it is reported that a negative-electrode material in which the oxidation numbers of Si atoms satisfy predetermined requirements is used (for example, see Japanese Unexamined Patent Application Publication No. 2005-183264). The negative-electrode material contains Si with an oxidation number of zero, a Si compound having a Si atom with an oxidation number of +4, and a lower oxide of Si having a silicon atoms with oxidation numbers of more than zero and less than +4.

SUMMARY

Electronic devices and so force have higher performance and more functions and are more frequently used. Thus, lithium-ion secondary batteries tend to be frequently charged and discharged. Hence, lithium-ion secondary batteries are required to have further improved battery characteristics.

It is desirable to provide a negative electrode for a lithium-ion secondary battery, the negative electrode providing excellent battery characteristics, a lithium-ion secondary battery, a battery pack, an electric vehicle, a power storage system, an electric tool, and an electronic device.

A negative electrode for a lithium-ion secondary battery according to an embodiment of the present application includes an active material, in which the active material includes a core portion capable of occluding and releasing lithium ions, and a covering portion arranged on at least part of a surface of the core portion, in which the covering portion contains, as constituent elements, Si, O, and at least one element M1 selected from Li, C, Mg, Al, Ca, Ti, Cr, Mn, Fe, Co, Ni, Cu, Ge, Zr, Mo, Ag, Sn, Ba, W, Ta, Na, and K, and the atomic ratio y (O/Si) of O to Si is $0.5 \leq y \leq 1.8$. A lithium-ion secondary battery according to an embodiment of the present application includes a positive electrode, a negative electrode, and an electrolytic solution, in which the negative electrode contains the same active material as that of the foregoing negative electrode for a lithium-ion secondary battery. A battery pack, an electric vehicle, a power storage system, an electric tool, or an electronic device according to an embodiment of the present application includes the lithium-ion secondary battery according to an embodiment of the present application.

In the negative electrode for a lithium-ion secondary battery or the lithium-ion secondary battery according to an embodiment of the present application, the active material of the negative electrode includes the covering portion on the surface of the core portion, in which the covering portion contains, as constituent elements, Si, O, and element M1, such as Li, and the atomic ratio y of O to Si is $0.5 \leq y \leq 1.8$. It is thus possible to obtain excellent battery characteristics. Furthermore, for the battery pack, the electric vehicle, the power storage system, the electric tool, or the electronic device according to an embodiment of the present application, it is possible to obtain the same effect.

Additional features and advantages are described herein, and will be apparent from the following Detailed Description and the figures.

DETAILED DESCRIPTION

Embodiments of the present application will be described in detail below with reference to the attached drawings. Descriptions are made in the order listed below:
1. negative electrode for lithium-ion secondary battery,
2. lithium-ion secondary battery,
2-1. prismatic type,
2-2. cylindrical type,
2-3. laminated-film type, 3. application of lithium-ion secondary battery,
3-1. battery pack,
3-2. electric vehicle,
3-3. power storage system, and
3-4. electric tool.

1. Negative Electrode for Lithium-Ion Secondary Battery

Figure 1:
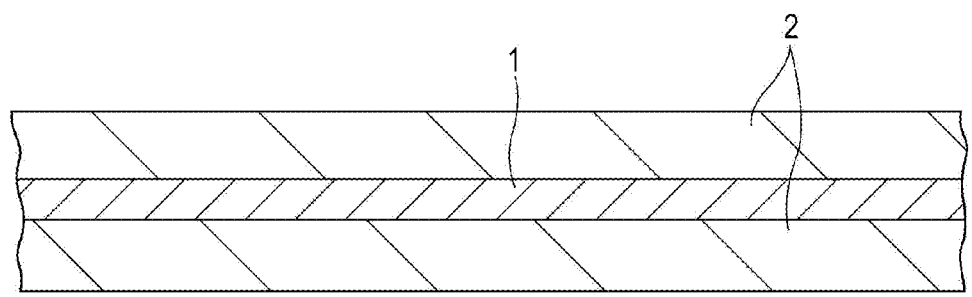
FIG. 1 is a sectional view illustrating a structure of a negative electrode for a lithium-ion secondary battery according to an embodiment of the present application.
Figure 2:
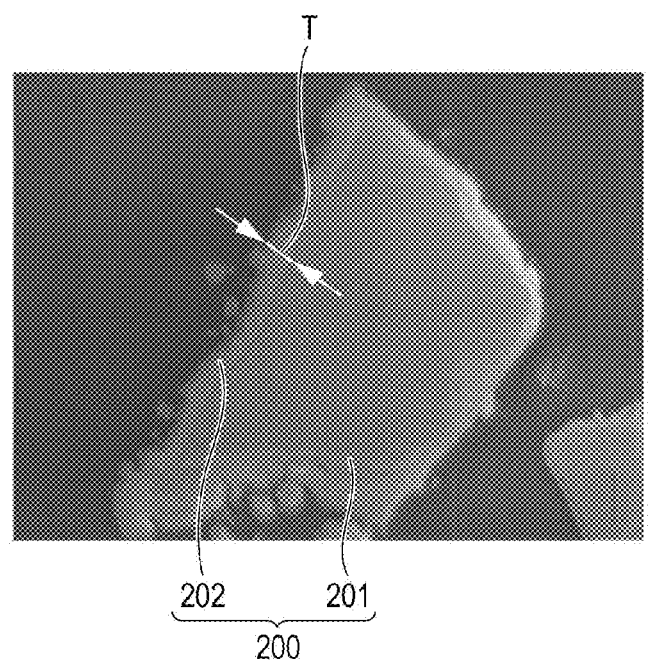
FIG. 2 is a photograph illustrating a sectional structure of a negative-electrode active material, the photograph being taken with a scanning electron microscope (SEM)

FIG. 1 illustrates a sectional structure of a negative electrode for a lithium-ion secondary battery (hereinafter, referred to simply as a "negative electrode") according to an embodiment of the present application. FIG. 2 is a SEM photograph illustrating the cross-sectional structure of an active material contained in the negative electrode (negative-electrode active material).

Overall Structure of Negative Electrode

The negative electrode includes, for example, as illustrated in FIG. 1, negative-electrode active material layers 2 on a negative-electrode collector 1. For this negative electrode, the negative-electrode active material layers 2 may be arranged on both surfaces of the negative-electrode collector 1. Alternatively, one negative-electrode active material layer may be arranged on only one surface of the collector. Furthermore, the negative-electrode collector 1 may not be arranged.

Negative-Electrode Collector

The negative-electrode collector 1 is composed of, for example, a conductive material having excellent electrochemical stability, electrical conductivity, and mechanical strength. Examples of the conductive material include Cu, Ni, and stainless steel. In particular, a material which does not form an intermetallic compound with Li and which can be alloyed with a material constituting the negative-electrode active material layers 2 is preferred.

The negative-electrode collector 1 preferably contains, as constituent elements, C and S. The reason for this is that the physical strength of the negative-electrode collector 1 is improved, so that the negative-electrode collector 1 is less likely to be deformed even if the negative-electrode active material layers 2 expand and contract during charge and discharge. An example of the negative-electrode collector 1 is metal foil doped with C and S. The C content and the S content are not particularly limited and are each preferably 100 ppm or less because a higher effect is obtained.

The negative-electrode collector 1 may have a roughened surface or may not have a roughened surface. An example of the negative-electrode collector 1 having an unroughened surface is rolled metal foil. An example of the negative-electrode collector 1 having a roughened surface is metal foil that has been subjected to electrolytic treatment or sandblasting. The electrolytic treatment is a method in which fine particles are formed on a surface of metal foil or the like in an electrolytic bath by an electrolytic process to produce irregularities. Metal foil produced by the electrolytic process is commonly referred to as electrolytic foil (e.g., electrolytic Cu foil).

The negative-electrode collector 1 preferably has a roughened surface because the adhesion of the negative-electrode active material layers 2 to the negative-electrode collector 1 is improved by an anchor effect. The surface roughness (e.g., ten-point height of irregularities Rz) of the negative-electrode collector 1 is not particularly limited and is preferably maximized in order to improve the adhesion of the negative-electrode active material layers 2 by the anchor effect. However, an excessively high surface roughness may result in a reduction in the adhesion of the negative-electrode active material layers 2.

Negative-Electrode Active Material Layer

Each of the negative-electrode active material layers 2 contains a plurality of particles of a negative-electrode active material 200 capable of occluding and releasing lithium ions as illustrated in FIG. 2. If necessary, each of the negative-electrode active material layers 2 may further contain an additional material, for example, a negative-electrode binder or a negative-electrode conductive agent.

The negative-electrode active material 200 includes a core portion 201 capable of occluding and releasing lithium ions and a covering portion 202 arranged on the core portion 201. The state in which the core portion 201 is covered with the covering portion 202 can be confirmed by SEM observation as illustrated in FIG. 2.

Core Portion

The composition of the core portion 201 is not particularly limited as long as the core portion 201 is capable of occluding and releasing lithium ions. In particular, the core portion 201 preferably contains, as a constituent element, at least one of Si and Sn because a high energy density is provided. The core portion 201 may contain Si in elemental form, a Si compound, a Si alloy, or two or more thereof. Similarly, Sn in elemental form, a Sn compound, or a Sn alloy may be contained. The term "elemental form" refers to an elemental form in a general sense (the element may contain minute quantities of impurities (elements other than oxygen)) and does not necessarily indicates a purity of 100%.

For example, the Si alloy contains Si and one or two or more elements selected from Sn, Ni, Cu, Fe, Co, Mn, Zn, In, Ag, Ti, Ge, Bi, Sb, Cr, and so forth. For example, the Si compound contains Si and one or two or more elements selected from C, O, and so forth. The Si compound may further contain one or two or more elements described in the Si alloy. Examples of the Si alloy and the Si compound include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq2$), and $LiSiO$.

For example, the Sn alloy contains Sn and one or two or more elements selected from Si, Ni, Cu, Fe, Co, Mn, Zn, In, Ag, Ti, Ge, Bi, Sb, Cr, and so forth. For example, the Sn compound contains Sn and one or two or more elements selected from C, O, and so forth. The Sn compound may further contain one or two or more elements described in the Sn alloy. Examples of the Sn alloy and the Sn compound include $SnO_w$ ($0<w\leq2$), $SnSiO_3$, $LiSnO$, $Mg_2Sn$, $SnCo$, $SnCoTi$, and $SnFeCo$.

Preferably, the core portion 201 contains, for example, Si and O serving as constituent elements, and the atomic ratio x of O to Si, i.e., O/Si, is $0 \leq x < 0.5$. The reason for this is that the core portion 201 easily occludes and releases lithium ions during charge and discharge and that a high battery capacity is obtained owing to a reduction in irreversible capacity, compared with the case where the atomic ratio x is outside the range ($0.5 \leq x$).

As is apparent from the foregoing composition (the atomic ratio x), the core portion 201 may be composed of elemental Si (x=0) or $SiO_x$ ($0<x<0.5$). Note that x is preferably minimized More preferably, x=0 (elemental Si). The reason for this is that a higher energy density is obtained and that the discharge capacity is less likely to decrease from the early stage of the charge-discharge cycle because the degradation of the core portion 201 is inhibited.

The core portion 201 may have a crystal structure (with high or low crystallinity) or an amorphous structure. The core portion 201 preferably has a crystal structure with high or low crystallinity and more preferably with high crystallinity. This is because the core portion 201 easily occludes and releases lithium ions during charge and discharge to achieve high battery capacity and so forth and because the core portion 201 is less likely to expand and contract during charge and discharge. In particular, in the core portion 201, the half-width (2θ) of a diffraction peak attributed to the silicon (111) crystal face observed by X-ray diffraction is preferably 20° or less, and the size of a crystallite attribute to the (111) crystal face is preferably 10 nm or more. This is because a higher effect is provided.

The median diameter of the core portion 201 is not particularly limited. In particular, the core portion 201 preferably has a median diameter of 0.3 μm to 20 μm because the core portion 201 easily occludes and releases lithium ions during charge and discharge and because the core portion 201 is not easily broken. More particularly, a median diameter of less than 0.3 μm can facilitate expansion and contraction during charge and discharge because of an excessively large total surface area of the core portion 201. A median diameter exceeding 20 μm is liable to lead to a break of the core portion 201 during charge and discharge.

The core portion 201 may contain, as a constituent element, one or two or more additional elements (excluding Si and Sn), together with Si and Sn.

Specifically, the core portion 201 preferably contains, as a constituent element, at least one element M2 selected from Fe and Al. Note that the ratio of M2 to Si and O, i.e., M2/(Si+O), is preferably in the range of 0.01 atomic percent to 50 atomic percent because the electrical resistance of the core portion 201 is reduced and because the diffusibility of is improved.

In the core portion 201, M2 may be present (in the free state) independently of Si and O or may be combined with at least one of Si and O to form an alloy or a compound. The composition (e.g., the bonding state of M2) of the core portion 201 including M2 can be identified by, for example, energy dispersive x-ray analysis (EDX). The bonding state and the identification method of M3 and M4 described below are the same as described above.

In particular, the core portion 201 preferably contains Al because the core portion 201 has low crystallinity, so that the core portion 201 is less likely to expand and contract during charge and discharge and the diffusibility of lithium ions is further improved. In the core portion 201 containing Al, the half-width (2θ) of a diffraction peak attributed to the Si(111) crystal face observed by X-ray diffraction is preferably 0.6° or more. The size of a crystallite attribute to the (111) crystal face is preferably 90 nm or less. In the case where the half-width is investigated, preferably, the covering portion 202 is removed by dissolution with HF or the like, and then the core portion 201 is analyzed.

More particularly, in the case where the core portion 201 does not contain Al and where the core portion 201 has high crystallinity, the core portion 201 easily expands and contracts during charge and discharge. In contrast, in the case where the core portion 201 contains Al, the core portion 201 is less likely to expand and contract during charge and discharge regardless of whether the core portion 201 has high or low crystallinity. In this case, when the core portion 201 has low crystallinity, the expansion and contraction of the core portion 201 are inhibited, and the diffusibility of lithium ions is improved.

The core portion 201 preferably contains, as a constituent element, at least one element M3 selected from Cr and Ni. Note that the ratio of M3 to Si and O, i.e., M3/(Si+O), is preferably in the range of 1 atomic percent to 50 atomic percent. Also in this case, the electrical resistance of the core portion 201 is reduced, and the diffusibility of lithium ions is improved.

The core portion 201 preferably contains, as a constituent element, at least one element M4 selected from B, Mg, Ca, Ti, V, Mn, Co, Cu, Ge, Y, Zr, Mo, Ag, In, Sn, Sb, Ta, W, Pb, La, Ce, Pr, and Nd. Note that the ratio of M4 to Si and O, i.e., M4/(Si+O), is preferably in the range of 0.01 atomic percent to 30 atomic percent. Also in this case, the electrical resistance of the core portion 201 is reduced, and the diffusibility of lithium ions is improved.

Covering Portion

The covering portion 202 is arranged on at least part of a surface of the core portion 201. Thus, the covering portion 202 may cover part of the surface of the core portion 201 or may cover the entire surface of the core portion 201. In the case of the former, the covering portion 202 may be arranged on a plurality of portions of a surface of the core portion 201 and may cover the portions.

The covering portion 202 contains, as constituent elements, Si, O, and element M1 that can form an alloy with Si. Element M1 is at least one selected from Li, C, Mg, Al, Ca, Ti, Cr, Mn, Fe, Co, Ni, Cu, Ge, Zr, Mo, Ag, Sn, Ba, W, Ta, Na, and K. The atomic ratio y of O to Si, i.e., O/Si, is $0.5 \leq y \leq 1.8$, preferably $0.7 \leq y \leq 1.3$, and more preferably $y=1.2$. This is because the protective function of the covering portion 202 described below is effectively provided.

The reason the atomic ratio y is within the range described above is that the degradation of the negative-electrode active material 200 is suppressed when charge and discharge are repeated compared with the case where the atomic ratio y is outside the range (i.e., y<0.5, or y>1.8). In this case, the core portion 201 chemically and physically protects the core portion 201 while the entry and exit of lithium ions from the core portion 201 are ensured.

More particularly, in the case where the covering portion 202 intervenes between the core portion 201 and an electrolytic solution, the highly reactive core portion 201 is less likely to come into contact with the electrolytic solution, thus inhibiting the decomposition reaction of the electrolytic solution. In this case, when the covering portion 202 is composed of a material similar to a material, which contains common Si as a constituent element, constituting the core portion 201, the adhesion of the covering portion 202 to the core portion 201 is increased.

The covering portion 202 is flexible (easily deformable). Thus, when the core portion 201 expands and contracts during charge and discharge, the covering portion 202 follows the deformation to expand and contract (extend and shrink) easily. Hence, if the core portion 201 expands and contracts, the covering portion 202 is less likely to be damaged (broken). As a result, the state of the core portion 201 covered with the covering portion 202 is maintained even if charge and discharge are repeated. Thus, even if the core portion 201 is broken during charge and discharge, a newly formed surface is less likely to be exposed. Furthermore, the newly formed surface is less likely to come into contact with an electrolytic solution, thus inhibiting the decomposition reaction of the electrolytic solution.

The reason the covering portion 202 contains M1 together with Si and O is that when the atomic ratio y is within the range described above, a compound (Si-M1-O) of Si, O, and M1 is easily formed in the covering portion 202. This results in a reduction in irreversible capacity and a reduction in the electrical resistance of the negative-electrode active material 200. In the covering portion 202, at least one of the atoms of M1 may form Si-M1-O. Also in this case, the foregoing advantages are provided. The remaining M1 may be present in a free elemental form, may form an alloy with Si, or may be combined with O to form a compound.

More particularly, with respect to the bonding states (valence) of Si atoms bonded to O atoms in the covering portion 202, five valence states are known: zero valence ($Si^{0+}$), monovalence ($Si^{1+}$), divalence ($Si^{2+}$), trivalence ($Si^{3+}$), and tetravalence ($Si^{4+}$). The presence or absence of Si atoms in these bonding states and their proportions (atomic ratios) can be determined by analysis of the covering portion 202 by, for example, X-ray photoelectron spectroscopy (XPS). Note that in the case where the outermost layer of the covering portion 202 is unintentionally oxidized ($SiO_2$ is formed), the analysis is preferably performed after $SiO_2$ is removed by dissolution with HF or the like.

In the case where Si-M1-O is formed in the covering portion 202, in the zero-valent to tetra-valent bonding states, the proportion of the tetravalent silicon which is liable to lead to irreversible capacity during charge and discharge and which has high resistance is relatively reduced. Thus, even if the covering portion 202 is arranged on the surface of the core portion 201, the presence of the covering portion 202 is less likely to lead to irreversible capacity, and the electrical resistance of the covering portion 202 is reduced.

The ratio of M1 to Si and O, i.e., M1/(Si+O), is not particularly limited and is preferably 50 atomic percent or less and more preferably 20 atomic percent or less. This is because the series of advantages of the covering portion 202 described above is obtained while suppressing a reduction in battery capacity due to the presence of M1.

As with the core portion 201, the covering portion 202 is preferably capable of occluding and releasing lithium ions. This is because the covering portion 202 is less likely to inhibit the occlusion and release of lithium ions, so that the core portion 201 easily occludes and releases lithium ions.

Furthermore, the covering portion 202 is preferably noncrystalline (amorphous) or preferably has low crystallinity. The reason for this is as follows: lithium ions are easily diffused compared with the case where the covering portion 202 is crystalline (with high crystallinity), so that even when the surface of the core portion 201 is covered with the covering portion 202, the core portion 201 easily and smoothly occludes and releases lithium ions.

In particular, the covering portion 202 is preferably noncrystalline. This is because the covering portion 202 has improved flexibility and thus easily follows the expansion and contraction of the core portion 201 during charge and discharge. Furthermore, the covering portion 202 is less likely to trap lithium ions, so that the entry and exit of lithium ions from the core portion 201 are less likely to be inhibited.

The term "low crystallinity" indicates that a material contained in the covering portion 202 includes a noncrystalline region and a crystalline region, the material being different from a "noncrystalline" material including a noncrystalline region alone. To identify whether the covering portion 202 has low crystallinity or not, for example, the covering portion 202 may be observed with a high-angle annular dark-field scanning transmission electron microscopy (HAADF STEM). If a TEM photograph reveals that a noncrystalline region and a crystalline region are both present, the covering portion 202 has low crystallinity. In the case where a noncrystalline region and a crystalline region are both present, the crystalline region is observed as a region (crystal grain) having a granular contour. A striped pattern (crystal lattice pattern) attributed to the crystallinity is observed inside the crystal grain. It is thus possible to distinguish the crystal grain from the noncrystalline region.

The covering portion 202 may have a single-layer structure or a multilayer structure. In particular, the covering portion 202 preferably has a multilayer structure. This is because the covering portion 202 is less likely to be broken even if the core portion 201 expands and contracts during charge and discharge. More particularly, for the covering portion 202 having a single-layer structure, internal stress in the covering portion 202 is not easily relaxed, depending on its thickness. Thus, the covering portion 202 can be broken (e.g., fracture or separation) by the effect of the expanded and contracted core portion 201 during charge and discharge. In contrast, for the covering portion 202 having a multilayer structure, a minute gap between layers functions as a gap that relaxes stress. Thus, the internal stress is relaxed, so that the covering portion 202 is not easily broken.

For the covering portion 202 having the single-layer structure, Si, O, and M1 are contained in the single layer. For the covering portion 202 having the multilayer structure, layers containing Si, O, and M1 may be stacked. Alternatively, a layer containing Si and O and a layer containing Si, O, and M1 may be stacked. Furthermore, these layers may be mixed. Also in this case, the same effect is provided. Of course, any stacking order of the layers may be used in the multilayer structure.

The average thickness of the covering portion 202 is not particularly limited. In particular, the average thickness is preferably minimized. The covering portion 202 preferably has an average thickness of 1 nm to 10,000 nm and more preferably 100 nm to 10,000 nm. This is because the core portion 201 easily occludes and releases lithium ions and because the protective function of the covering portion 202 is effectively provided. More particularly, an average thickness of less than 1 nm can cause the covering portion 202 to be less likely to protect the core portion 201. An average thickness exceeding 10,000 nm can increase the electrical resistance and can cause the core portion 201 to be less likely to occlude and release lithium ions during charge and discharge. The reason for this is that in the case where the covering portion 202 is composed of $SiO_y$, $SiO_y$ easily occludes lithium ions but does not easily release lithium ions that have been occluded.

The average thickness of the covering portion 202 is calculated by the following procedure. As illustrated in FIG. 2, one particle of the negative-electrode active material 200 is observed with a scanning electron microscope (SEM). To measure the thickness T of the covering portion 202, the observation is preferably performed at a magnification such that the boundary between the core portion 201 and the covering portion 202 can be visually identified (determined). Subsequently, thicknesses of the covering portion 202 are measured at 10 random positions. Then the average value of the thicknesses (average thickness T of one particle) is calculated. In this case, the measurement positions are preferably set in such a manner that the measurement positions are not localized at a specific site but are widely distributed to the extent possible. Next, the foregoing calculation of the average value is repeated until the total number of particles observed with the SEM reaches 100. Finally, the average value (average value of the average thicknesses T) of the calculated average thicknesses T (corresponding to the respective particles) of 100 particles of the negative-electrode active material 200 is calculated and defined as the average thickness of the covering portion 202.

The average coverage of the covering portion 202 on the core portion 201 is not particularly limited and is preferably maximized. More preferably, the average coverage of the covering portion 202 is preferably in the range of 30% to 100% because the protective function of the covering portion 202 is further improved.

The average coverage of the covering portion 202 is calculated by the following procedure. As with the case where the average thickness is calculated, one particle of the negative-electrode active material 200 is observed with a scanning electron microscope (SEM). The observation is preferably performed at a magnification such that in the core portion 201, a portion that is covered with the covering portion 202 and a portion that is not covered with the covering portion 202 can be visually distinguished. With respect to the outer edge (contour) of the core portion 201, the length of a portion that is covered with the covering portion 202 and the length of a portion that is not covered with the covering portion 202 are measured. Then the following calculation is performed: coverage (coverage for one particle: %)=(length of portion covered with covering portion 202/length of outer edge of core portion 201)×100. Next, the foregoing calculation of the coverage is repeated until the total number of particles observed with the SEM reaches 100. Finally, the average value of the calculated coverage values (corresponding to the respective particles) of 100 particles of the negative-electrode active material 200 is calculated and defined as the average coverage of the covering portion 202.

The covering portion 202 is preferably adjacent to the core portion 201 and may be present on the surface of the core portion 201 with a natural oxide film ($SiO_2$) provided therebetween. The natural oxide film is formed by, for example, oxidation of a surface portion of the core portion 201 in air. In the case where the core portion 201 is present in the middle of each particle of the negative-electrode active material 200 and where the covering portion 202 is present outside the particle, the presence of the natural oxide film has little effect on functions of the core portion 201 and the covering portion 202.

To check the fact that the negative-electrode active material 200 includes the core portion 201 and the covering portion 202, the negative-electrode active material 200 may be analyzed by, for example, X-ray photoelectron spectroscopy (XPS) or energy-dispersive X-ray analysis (EDX) in addition to the SEM observation described above.

In this case, for example, the compositions of the core portion 201 and the covering portion 202 can be identified by measuring the degrees of oxidation (atomic ratios x and y) at the central portion and the surface portion of each particle of the negative-electrode active material 200. To investigate the composition of the core portion 201 covered with the covering portion 202, the covering portion 202 may be removed by dissolution with HF or the like.

An exemplary procedure for measuring the degree of oxidation will be described in detail below. First, the negative-electrode active material 200 (the core portion 201 covered with the covering portion 202) is quantified by a combustion method to calculate the total amount of Si and the total amount of O. Next, the covering portion 202 is removed by rinsing with HF, and then the core portion 201 is quantified to calculate the amount of Si and the amount of O. Finally, the amount of Si and the amount of O in the covering portion 202 are determined by subtracting the amount of Si and the amount of O in the core portion 201 from the total amount of Si and the total amount of O. As a result, the amounts of Si and the amounts of O in the core portion 201 and the covering portion 202 are determined, thus determining the degrees of oxidation therein. In place of the removal of the covering portion 202 by rinsing, the degrees of oxidation may be measured by the use of the core portion 201 covered with the covering portion 202 and a portion of the core portion 201 that is not covered therewith.

Conductive Portion

In particular, the negative-electrode active material 200 may include a conductive portion on a surface of the covering portion 202. The conductive portion is arranged on at least part of a surface of the covering portion 202 and has a lower electrical resistance than those of the core portion 201 and the covering portion 202. In this case, the core portion 201 does not easily come into contact with an electrolytic solution, thus inhibiting the decomposition reaction of the electrolytic solution. Furthermore, the electrical resistance of the negative-electrode active material 200 is further reduced. The conductive portion contains, for example, one or two or more of carbon materials, metal materials, and inorganic compounds. An example of carbon materials is graphite. Examples of metal materials include Fe, Cu, and Al. An example of inorganic compounds is $SiO_2$. Among these materials, carbon materials or metal materials are preferred. Carbon materials are more preferred. This is because the electrical resistance of the negative-electrode active material 200 is further reduced. Note that the conductive portion may have any average coverage and any average thickness. The average coverage and the average thickness are calculated in the same ways as those used for the covering portion 202.

The negative-electrode binder contains, for example, one or two or more of synthetic rubber and polymeric materials. Examples of synthetic rubber include styrene-butadiene-based rubber, fluorocarbon rubber, and ethylene-propylene-diene. Examples of polymeric materials include polyvinylidene fluoride, polyimide, polyamide, polyamide-imide, polyacrylic acid, lithium polyacrylate, sodium polyacrylate, polymaleic acid, and copolymers thereof. Further examples of polymeric materials include carboxymethyl cellulose, styrene-butadiene rubber, and polyvinyl alcohol.

The negative-electrode conductive agent contains, for example, one or two or more of carbon materials, such as graphite, carbon black, acetylene black, and Ketjenblack. The negative-electrode conductive agent may also be a conductive material, for example, a metal material or a conductive polymer.

Each of the negative-electrode active material layers 2 may contain another negative-electrode active material in addition to the negative-electrode active material 200 including the core portion 201 and the covering portion 202 described above, if necessary.

An example of another negative-electrode active material is a carbon material. This is because the electrical resistance of the negative-electrode active material layers 2 is reduced and because the negative-electrode active material layers 2 are less likely to expand and contract during charge and discharge. Examples of the carbon material include graphitizable carbon, non-graphitizable carbon in which the interplanar spacing of the (002) planes is 0.37 nm or more, and graphite in which the interplanar spacing of the (002) planes is 0.34 nm or less. Specific examples thereof include pyrolytic carbon, coke, glassy carbon fibers, a burned organic polymeric compound, activated carbon, and carbon black. Examples of coke include pitch coke, needle coke, and petroleum coke. The burned organic polymeric compound refers to a material formed by burning a phenolic resin or a furan resin at an appropriate temperature into carbon. The carbon material may have any shape selected from fibrous shapes, spherical shapes, granular shapes, and flaky shapes. The carbon material content of the negative-electrode active material layers 2 is not particularly limited and is preferably 60% by weight or less and more preferably 10% by weight to 60% by weight.

Furthermore, another negative-electrode active material may be a metal oxide or a polymeric compound. Examples of the metal oxide include iron oxide, ruthenium oxide, and molybdenum oxide. Examples of the polymeric compound include polyacetylene, polyaniline, and polypyrrole.

The negative-electrode active material layers 2 are formed by, for example, an application method, a firing method (a sintering method), or a combination of two or more thereof. The application method refers to a method in which, for example, a negative-electrode active material is mixed with a negative-electrode binder, the resulting mixture is dispersed in an organic solvent, and application is performed. The firing method refers to a method in which, for example, after application is performed in the same way as the application method, heat treatment is performed at a temperature higher than the melting point of the negative-electrode binder or the like. As the firing method, a method of the related art may be employed. Examples thereof include an atmosphere firing method, a reactive firing method, and a hot-press firing method.

Production Method of Negative Electrode

A negative electrode is produced by, for example, a procedure described below. The materials constituting the negative-electrode collector 1 and the negative-electrode active material layers 2 have been described in detail. Thus, the descriptions are appropriately omitted.

First, the granular (powdery) core portion 201 having the foregoing composition is formed by, for example, a gas atomization method, a water atomization method, or a melt pulverization method.

Next, the covering portion 202 having the foregoing composition is formed on the surface of the core portion 201 by a vapor deposition method, for example, an evaporation method or a sputtering method. In the case where a material constituting the covering portion 202 is deposited by the vapor deposition method as described above, the covering portion 202 tends to be noncrystalline. In this case, the material constituting the covering portion 202 may be deposited while being heated by, for example, induction heating, resistance heating, or electron-beam heating. Alternatively, after the formation of the covering portion 202, the covering portion 202 may be heated so as to have low crystallinity. The degree of the low crystallinity is controlled, depending on, for example, heating conditions, such as temperature and time. The heat treatment results in the removal of water in the covering portion 202 and results in improvement in the adhesion of the covering portion 202 to the core portion 201.

In particular, in the case where the vapor deposition method is employed, Si-M1-O is easily formed in the covering portion 202 by heating not only the material constituting the covering portion 202 but also a substrate used for the deposition. For example, the substrate temperature is preferably 200° C. or higher and lower than 900° C. When the covering portion 202 is formed, the proportions of the bonding states of Si atoms bonded to O atoms can be controlled by adjusting the flow rates of oxygen ($O_2$), hydrogen ($H_2$), and so forth introduced into a chamber and by adjusting the temperature of the core portion 201. As a result, the core portion 201 is covered with the core portion 201, resulting in the negative-electrode active material 200.

In the case where the negative-electrode active material 200 is formed, a conductive portion may be formed on the surface of the covering portion 202 by, for example, a vapor deposition method, such as an evaporation method, a sputtering method, or a chemical vapor deposition (CVD) method, or a wet coating method.

In the case where the evaporation method is employed, for example, vapor is allowed to impinge directly on the surface of the negative-electrode active material 200. In the case where the sputtering method is employed, for example, a conductive portion is formed by a powder sputtering method while Ar gas is introduced. In the case where the CVD method is employed, for example, a gas formed by subliming a metal chloride and a mixed gas of $H_2$, $N_2$, and so forth are mixed in such a manner that the mole fraction of the metal chloride is in the range of 0.03 to 0.3, and then the resulting gas is heated to 1000° C. or higher to form a conductive portion on the surface of the covering portion 202. In the case where the wet coating method is employed, for example, an alkali solution is added to a slurry containing the negative-electrode active material 200 while a metal-containing solution is added to the slurry to form a metal hydroxide. Then reduction treatment with $H_2$ is performed at 450° C. to form a conductive portion on the surface of the covering portion 202. In the case where a carbon material is used as a material constituting the conductive portion, the negative-electrode active material 200 is placed in a chamber. An organic gas is introduced into the chamber. Heat treatment is performed at 10,000 Pa and 1000° C. or higher for 5 hours to form a conductive portion on the surface of the covering portion 202. The organic gas is not particularly limited as long as it is thermally decomposed to form carbon. Examples of the organic gas include methane, ethane, ethylene, acetylene, and propane.

Next, the negative-electrode active material 200 and other materials, such as the negative-electrode binder, are mixed to form a negative-electrode mixture. The resulting negative-electrode mixture is dissolved in a solvent, such as an organic solvent, to form a slurry containing the negative-electrode mixture. Finally, the slurry containing the negative-electrode mixture is applied to the surface of the negative-electrode collector 1 and dried to form the negative-electrode active material layers 2. If necessary, the negative-electrode active material layers 2 may be subjected to compression forming and heated (fired).

Function and Effect of Embodiment

In the negative electrode, the negative-electrode active material 200 includes the covering portion 202 on the surface of the core portion 201. The covering portion 202 contains, as constituent elements, Si, O, and element M1, such as Li. The atomic ratio y of O to Si is $0.5 \leq y \leq 1.8$. Thus, the core portion 201 easily and smoothly occludes and releases lithium ions. Furthermore, the core portion 201 is protected by the covering portion 202 so as not to expose a newly-formed surface during charge and discharge while the smooth occlusion and release are maintained. Moreover, Si-M-O is easily formed in the covering portion 202. Thus, the presence of the covering portion 202 is less likely to lead to irreversible capacity, and the electrical resistance of the covering portion 202 is reduced. Accordingly, the negative electrode contributes to improvement in the performance of a lithium-ion secondary battery including the negative electrode. Specifically, the negative electrode contributes to improvement in cycle characteristics, initial charge-discharge characteristics, load characteristics, and so forth.

In particular, in the case where the ratio of M1 to Si and O in the covering portion 202 is preferably 50 atomic percent or less and more preferably 20 atomic percent or less, a higher effect can be provided. In the case where the covering portion 202 on the core portion 201 has an average coverage of 30% to 100% or where the covering portion 202 has an average thickness of 1 nm to 10,000 nm, a higher effect can be provided. Moreover, the covering portion 202 has a multilayer structure, a higher effect can be provided.

2. Lithium-Ion Secondary Battery

A lithium-ion secondary battery including the negative electrode for a lithium-ion secondary battery (hereinafter, referred to simply as "secondary battery") will be described below.

2-1. Prismatic Type

Figure 3:
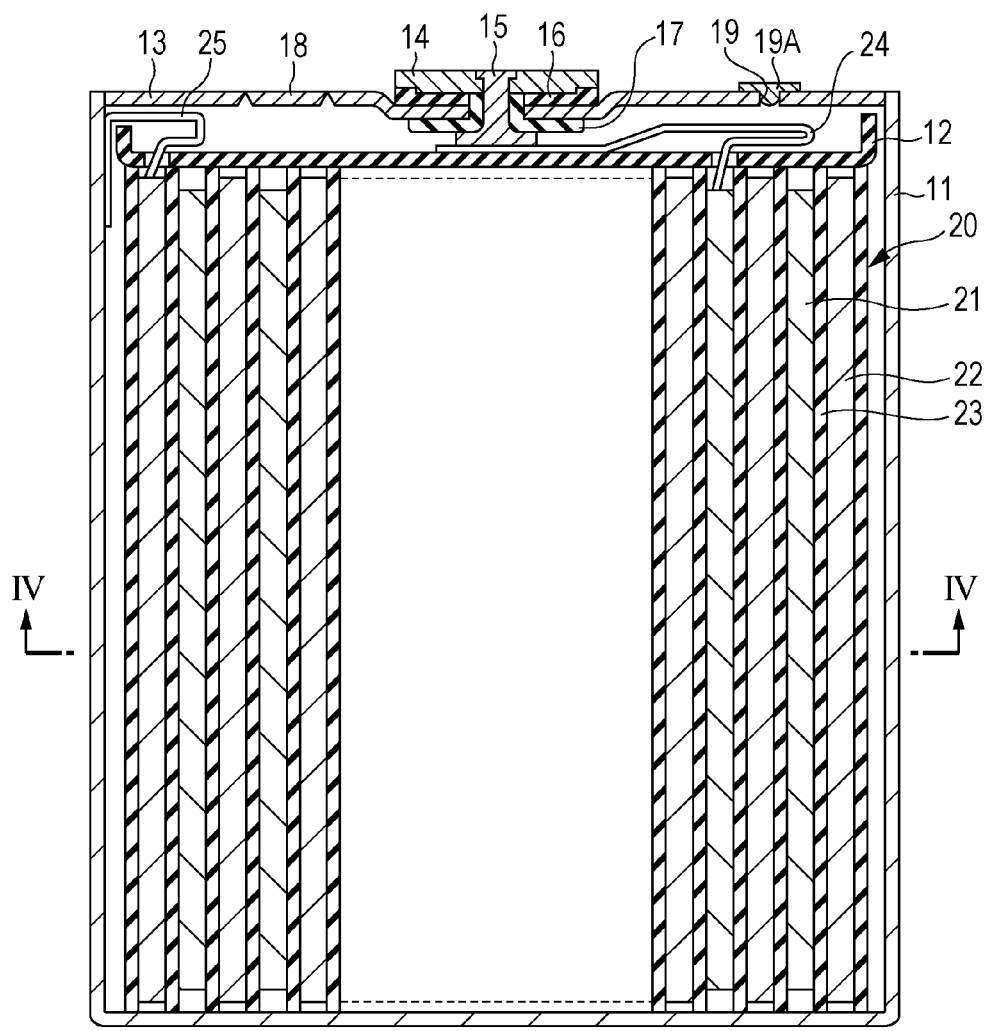
FIG. 3 is a sectional view illustrating a structure of a lithium-ion secondary battery (prismatic type) according to an embodiment of the present application.
Figure 4:
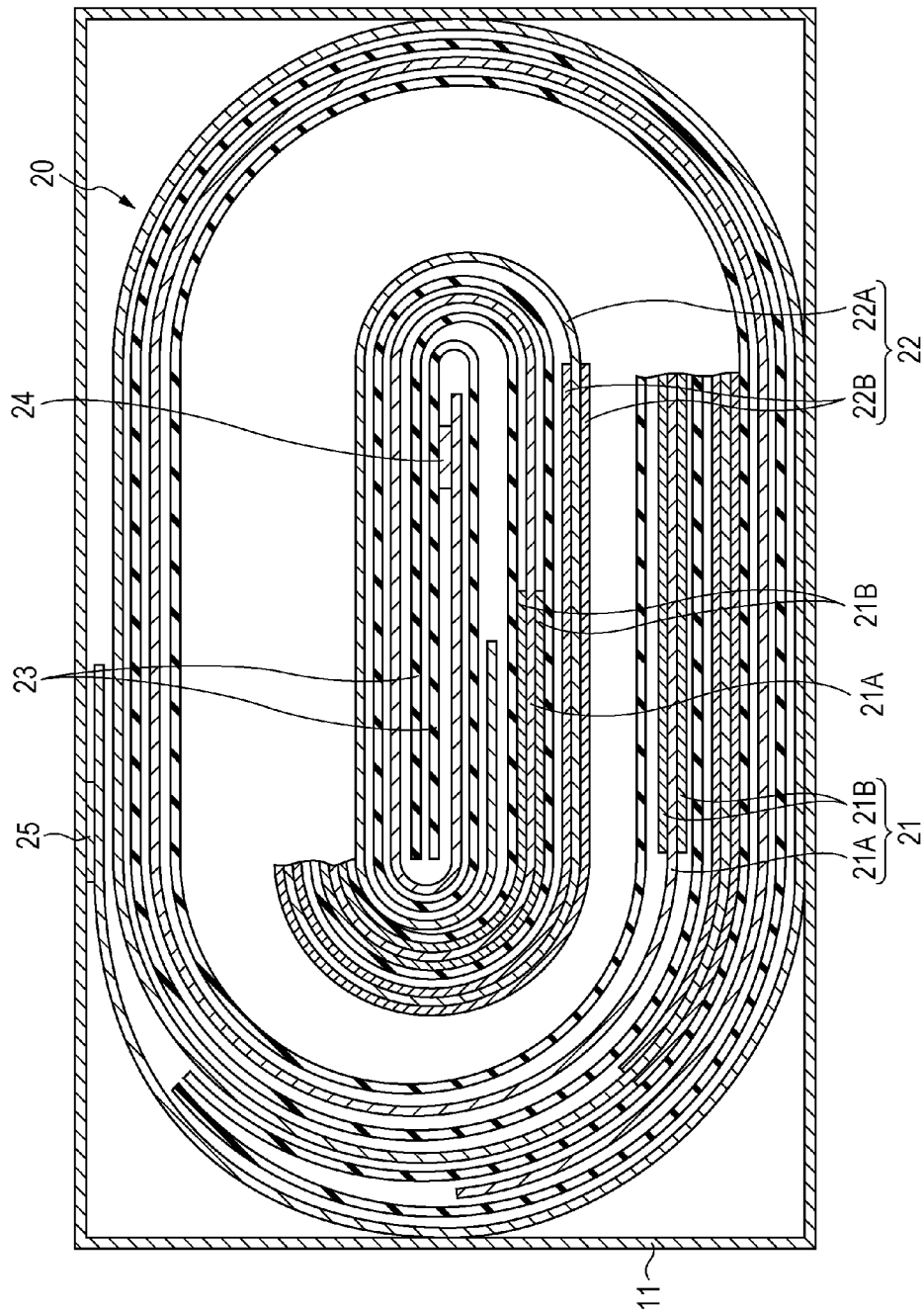
FIG. 4 is a sectional view taken along line IV-IV in FIG. 3 that illustrates the lithium-ion secondary battery.
Figure 5:
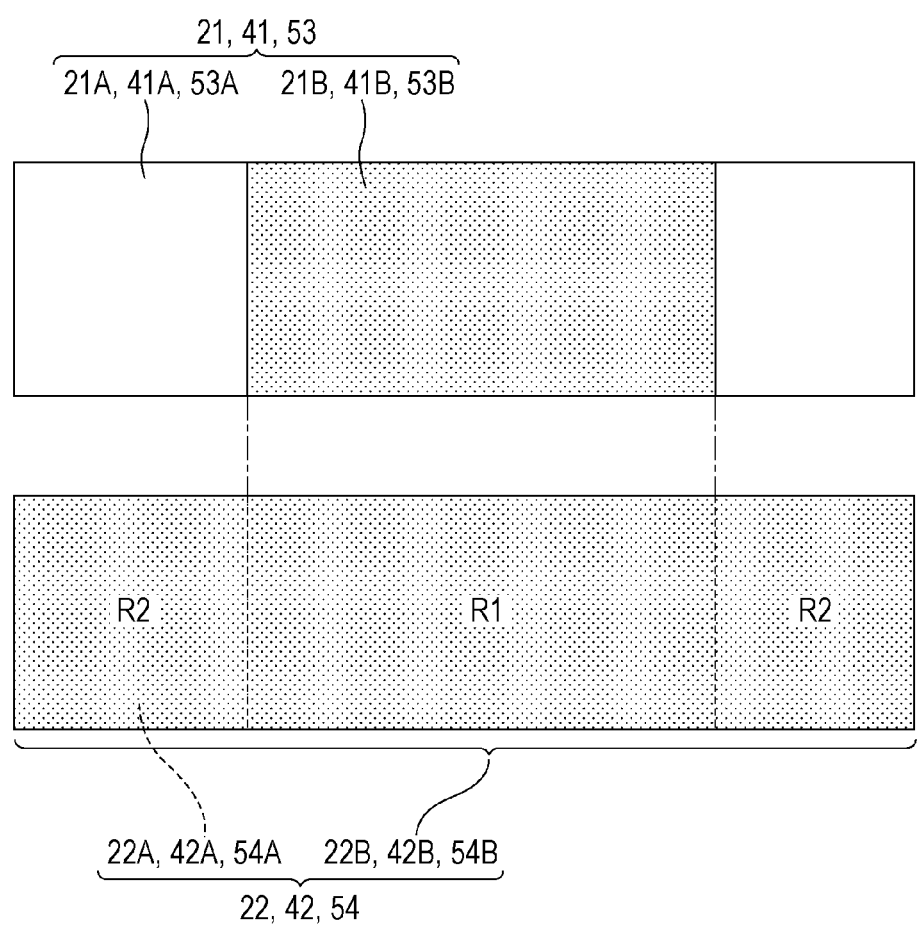
FIG. 5 is a schematic plan view illustrating structures of a positive electrode and a negative electrode illustrated in FIG. 4.

FIGS. 3 and 4 are sectional views illustrating a structure of a prismatic lithium-ion secondary battery. FIG. 4 is a sectional view taken along line IV-IV in FIG. 3. FIG. 5 is a schematic plan view illustrating structures of a positive electrode 21 and a negative electrode 22 illustrated in FIG. 4.

Entire Structure of Secondary Battery

The prismatic secondary battery mainly includes a battery element 20 in a battery can 11. The battery element 20 is formed of a spirally wound laminate in which the positive electrode 21 and the negative electrode 22 are stacked with a separator 23 provided therebetween and spirally wound, the battery element 20 having a flattened shape in response to the shape of the battery can 11.

The battery can 11 is, for example, a prismatic package member. As illustrated in FIG. 4, the prismatic package member has a rectangular or substantially rectangular (partially curved) shape in longitudinal section. The prismatic package member can be used to not only a prismatic battery with a rectangular shape but also a prismatic battery with an oval shape. In other words, the prismatic package member is a vessel-shaped member having a rectangular closed end or an oval closed end and having an opening portion with a rectangular shape or a substantially rectangular (oval) shape formed by connecting arcs with straight lines. FIG. 4 illustrates the battery can 11 having a rectangular section.

The battery can 11 is composed of a conductive material, for example, iron, aluminum, or an alloy thereof. The battery can 11 may function as an electrode terminal. Among these materials, Fe, which is harder than Al, is preferred in order to prevent swelling of the battery can 11 during charge and discharge with use of the hardness (resistance to deformation) of the battery can 11. In the case where the battery can 11 is composed of Fe, the surface of the battery can 11 may be plated with Ni or the like.

The battery can 11 has a hollow structure having an open end portion and a closed end portion. The battery can 11 is sealed with an insulating plate 12 and a battery cover 13 attached to the open end portion. The insulating plate 12 is arranged between the battery element 20 and the battery cover 13. The insulating plate 12 is composed of an insulating material, such as polypropylene. The battery cover 13 is composed of, for example, a material the same as that of the battery can 11. Similarly to the battery can 11, the battery cover 13 may function as an electrode terminal.

A terminal plate 14 serving as a positive-electrode terminal is arranged outside the battery cover 13. The terminal plate 14 is electrically insulated from the battery cover 13 with an insulating case 16 provided therebetween. The insulating case 16 is composed of an insulating material, such as polybutylene terephthalate. A through hole is arranged in the substantially middle of the battery cover 13. A positive-electrode pin 15 is interposed in the through hole so as to be electrically connected to the terminal plate 14 and so as to be electrically insulated from the battery cover 13 with a gasket 17. The gasket 17 is composed of, for example, an insulating material. The surface of the gasket 17 is coated with asphalt.

A cleavage valve 18 and an injection hole 19 are arranged at the outer edge of the battery cover 13. The cleavage valve 18 is electrically connected to the battery cover 13. If the internal pressure of the battery is increased to a predetermined value or higher by an internal short-circuit or externally applied heat, the cleavage valve 18 is separated from the battery cover 13 to release the internal pressure. The injection hole 19 is capped with a sealing member 19A formed of, for example, a stainless-steel ball.

A positive-electrode lead 24 composed of a conductive material, such as Al, is attached to an end portion (for example, an inner end portion) of the positive electrode 21. A negative-electrode lead 25 composed of a conductive material, such as Ni, is attached to an end portion (for example, an outer end portion) of the negative electrode 22. The positive-electrode lead 24 is welded to an end of the positive-electrode pin 15 and is electrically connected to the terminal plate 14. The negative-electrode lead 25 is welded and electrically connected to the battery can 11.

Positive Electrode

For example, the positive electrode 21 includes a positive-electrode active material layer 21B provided on each surface of a positive-electrode collector 21A. Alternatively, the positive-electrode active material layer 21B may be arranged on only one surface of the positive-electrode collector 21A.

The positive-electrode collector 21A is composed of a conductive material, e.g., Al, Ni, or stainless steel.

Each of the positive-electrode active material layers 21B contains one or two or more positive-electrode materials which serve as positive-electrode active materials and which are capable of occluding and releasing lithium ions. If necessary, each of the positive-electrode active material layers 21B may further contain an additional material, for example, a positive-electrode binder or a positive-electrode conductive agent. Details of the positive-electrode binder and the positive-electrode conductive agent are the same as those of the negative-electrode binder and the negative-electrode conductive agent described above.

As the positive-electrode material, a Li-containing compound is preferred because a high energy density is provided. Examples of the Li-containing compound include a complex oxide that contains, as constituent elements, Li and a transition metal element; and a phosphate compound that contains, as constituent elements, Li and a transition metal element. It is preferred that the transition metal element be one or two or more of Co, Ni, Mn, and Fe. This is because a higher voltage is provided. The complex oxide and the phosphate compound are expressed as, for example, $Li_xM11O_2$ and $Li_yM12PO_4$, respectively, wherein M11 and M12 each represent one or more transition metal elements, and the values of x and y vary depending on a charge-discharge state of the battery and are usually $0.05 \leq x \leq 1.10$ and $0.05 \leq y \leq 1.10$. In particular, when the positive-electrode material contains Ni or Mn, the volume stability tends to be improved.

Examples of the complex oxide containing Li and a transition metal element include $Li_xCoO_2$, $Li_xNiO_2$, and a LiNi-based complex oxide represented by formula (1). Examples of the phosphate compound containing Li and a transition metal element include $LiFePO_4$ and $LiFe_{1-u}Mn_uPO_4$ (u<1). In this case, a high battery capacity and excellent cycle characteristics are provided. The positive-electrode material may be a material other than the foregoing materials. Examples thereof include materials represented by $Li_xM14_yO_2$ (wherein M14 represents at least one selected from Ni and M13 described in formula (1); x>1; and y represents any value).

$$LiNi_{1-x}M13_xO_2 \qquad (1)$$

(wherein M13 represents at least one selected from Co, Mn, Fe, Al, V, Sn, Mg, Ti, Sr, Ca, Zr, Mo, Tc, Ru, Ta, W, Re, Y, Cu, Zn, Ba, B, Cr, Si, Ga, P, Sb, and Nb; and x is 0.005<x<0.5).

Further examples of the positive-electrode material include oxides, disulfides, chalcogenides, and conductive polymers. Examples of oxides include titanium oxide, vanadium oxide, and manganese dioxide. Examples of disulfides include titanium disulfide and molybdenum sulfide. An example of chalcogenides is niobium selenide. Examples of conductive polymers include sulfur, polyaniline, and polythiophene.

Negative Electrode

The negative electrode 22 has the same structure as that of the foregoing negative electrode for a lithium-ion secondary battery. For example, the negative electrode 22 includes a negative-electrode active material layer 22B provided on each surface of a negative-electrode collector 22A. The structures of the negative-electrode collector 22A and the negative-electrode active material layers 22B are the same as those of the negative-electrode collector 1 and the negative-electrode active material layers 2. The chargeable capacity of the negative-electrode material capable of occluding and releasing lithium ions is preferably higher than the discharge capacity of the positive electrode 21 in order to prevent metallic Li from being unintentionally deposited during charge and discharge.

As illustrated in FIG. 5, for example, each of the positive-electrode active material layers 21B is arranged on a portion (for example, a middle region in the longitudinal direction) of a corresponding one of the surfaces of the positive-electrode collector 21A. Meanwhile, for example, each of the negative-electrode active material layers 22B is arranged on the whole of a corresponding one of the surfaces of the negative-electrode collector 22A. Thus, each of the negative-electrode active material layers 22B is arranged in a region (opposed region R1) of the negative-electrode collector 22A which is opposed to a corresponding one of the positive-electrode active material layers 21B, and a region (non-opposed region R2) of the negative-electrode collector 22A which is not opposed to the corresponding positive-electrode active material layer 21B. In this case, a portion of each negative-electrode active material layer 22B arranged in the opposed region R1 is associated with charge and discharge, whereas a portion arranged in the non-opposed region R2 has little association with charge and discharge. In FIG. 5, shaded areas indicate the positive-electrode active material layer 21B and the negative-electrode active material layer 22B.

As described above, the negative-electrode active material 200 (see FIG. 2) contained in the negative-electrode active material layers 22B includes the core portion 201 and the covering portion 202. However, the negative-electrode active material layers 22B might be deformed or broken by expansion and contraction during charge and discharge. Thus, the formation states of the core portion 201 and the covering portion 202 may be changed from states at the time of the formation of the negative-electrode active material layers 22B. However, in the non-opposed region R2, the formation states of the negative-electrode active material layers 22B are little affected by charge and discharge and are maintained. Thus, the foregoing parameters, such as the presence or absence of the core portion 201 and the covering portion 202, the compositions (atomic ratios x and y) of the core portion 201 and the covering portion 202, and the proportion of M1, are preferably investigated in the negative-electrode active material layers 22B in the non-opposed region R2. This is because the presence or absence of the core portion 201 and the covering portion 202, the compositions of the core portion 201 and the covering portion 202, and so forth can be investigated reproducibly and accurately independent of charge-discharge history (e.g., whether charge and discharge are performed or not, and the number of times of charge and discharge).

The maximum utilization factor in a fully charged state of the negative electrode 22 (hereinafter, referred to simply as a "negative-electrode utilization factor") is not particularly limited. Any negative-electrode utilization factor may be set in response to the ratio of the capacity of the positive electrode 21 to the capacity of the negative electrode 22.

The foregoing "negative-electrode utilization factor" is expressed as utilization factor Z (%)=(X/Y)×100, where X represents the amount of lithium ions occluded in the negative electrode 22 per unit area in a fully charged state, and Y represents the amount of lithium ions that can be electrochemically occluded in the negative electrode 22 per unit area.

For example, the amount X occluded can be determined by the following procedure. First, the secondary battery is charged to a fully charged state. The secondary battery is then disassembled to cut out a portion (test piece of the negative electrode) of the negative electrode 22 opposed to the positive electrode 21. Next, an evaluation battery including metallic lithium serving as a counter electrode is assembled using the test piece of the negative electrode. Finally, the evaluation battery is discharged to measure the discharge capacity at the time of initial discharge. The discharge capacity is divided by the area of the test piece of the negative electrode to determine the amount X occluded. In this case, the term "discharge" indicates that a current flows in a direction where lithium ions are released from the test piece of the negative electrode. For example, the battery is subjected to constant current discharge at a constant current, for example, at a current density of 0.1 mA/cm$^2$, until the battery voltage reaches 1.5 V.

Meanwhile, for example, the amount Y occluded is determined by subjecting the foregoing discharged evaluation battery to constant voltage and constant current charge until the battery voltage reaches 0 V, measuring the charge capacity, and dividing the charge capacity by the area of the test piece of the negative electrode. In this case, the term "charge" indicates that a current flows in a direction where lithium ions are occluded in the test piece of the negative electrode. For example, the battery is subjected to constant voltage charge at a current density of 0.1 mA/cm$^2$ and a battery voltage of 0 V until the current density reaches 0.02 mA/cm$^2$.

In particular, the negative-electrode utilization factor is preferably in the range of 35% to 80% because excellent cycle characteristics, initial charge-discharge characteristics, and load characteristics are provided.

Separator

The separator 23 isolates the positive electrode 21 from the negative electrode 22 to prevent the occurrence of a short circuit due to the contact of both electrodes and allows lithium ions to pass therethrough. The separator 23 is formed of, for example, a porous film of a synthetic resin or a ceramic material. The separator 23 may be formed of a laminated film in which two or more porous films are stacked. Examples of the synthetic resin include polytetrafluoroethylene, polypropylene, and polyethylene.

Electrolytic Solution

The separator 23 is impregnated with an electrolytic solution, which is a liquid electrolyte. The electrolytic solution is formed by dissolution of an electrolyte salt in a solvent. The electrolytic solution may contain an additional material, such as an additive, if necessary.

The solvent contains one or two or more of nonaqueous solvents, such as organic solvents. Examples of nonaqueous solvents include ethylene carbonate, propylene carbonate, butylene carbonate, dimethyl carbonate, diethyl carbonate, ethyl methyl carbonate, methyl propyl carbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, methyl trimethylacetate, ethyl trimethylacetate, acetonitrile, glutaronitrile, adiponitrile, methoxyacetonitrile, 3-methoxypropionitrile, N,N-dimethylformamide, N-methylpyrrolidinone, N-methyloxazolidinone, N,N'-dimethylimidazolidinone, nitromethane, nitroethane, sulfolane, trimethyl phosphate, and dimethyl sulfoxide. In this case, excellent battery capacity, cycle characteristics, and storage characteristics are provided.

In particular, at least one selected from ethylene carbonate, propylene carbonate, dimethyl carbonate, diethyl carbonate, and ethyl methyl carbonate is preferred because superior characteristics are provided. In this case, a combination of a high-viscosity (high dielectric constant) solvent (for example, dielectric constant $\in \geq 30$), e.g., ethylene carbonate or propylene carbonate, and a low-viscosity solvent (for example, viscosity $\leq 1$ mPa·s), e.g., dimethyl carbonate, ethyl methyl carbonate, or diethyl carbonate, is more preferred because the dissociation property of the electrolyte salt and ion mobility are improved.

In particular, the nonaqueous solvent preferably contains at least one of a halogenated chain carbonate and a halogenated cyclic carbonate. This is because a stable coating film is formed on a surface of the negative electrode 22 during charge and discharge, thereby inhibiting the decomposition reaction of the electrolytic solution. The halogenated chain carbonate indicates a chain carbonate containing a halogen serving as a constituent element. In other words, the halogenated chain carbonate indicates a chain carbonate in which at least one hydrogen atom is substituted with a halogen. The halogenated cyclic carbonate indicates a cyclic carbonate containing a halogen serving as a constituent element. In other words, the halogenated cyclic carbonate indicates a cyclic carbonate in which at least one H is substituted with a halogen.

The type of halogen is not particularly limited. In particular, F, Cl, or Br is preferred, and F is more preferred. This is because F provides a higher effect than those of other halogens. With respect to the number of halogen atoms, two halogen atoms are more preferable than one halogen atom. Furthermore, three or more halogen atoms may be used. The reason for this is that the ability to form a protective film is increased and a stronger and stabler coating film is formed, thereby further inhibiting the decomposition reaction of the electrolytic solution.

Examples of the halogenated chain carbonate include fluoromethyl methyl carbonate, bis(fluoromethyl) carbonate, and difluoromethyl methyl carbonate. Examples of the halogenated cyclic carbonate include 4-fluoro-1,3-dioxolan-2-one, and 4,5-difluoro-1,3-dioxolan-2-one. For the halogenated cyclic carbonate, geometrical isomers are included. The proportions of the halogenated chain carbonate and the halogenated cyclic carbonate in the nonaqueous solvent are each in the range of, for example, 0.01% by weight to 50% by weight.

The nonaqueous solvent preferably contains an unsaturated carbon bond cyclic carbonate. This is because a stable coating film is formed on a surface of the negative electrode 22 during charge and discharge to inhibit the decomposition reaction of the electrolytic solution. The unsaturated carbon bond cyclic carbonate indicates a cyclic carbonate having one or two or more unsaturated carbon bonds. In other words, the unsaturated carbon bond cyclic carbonate indicates a cyclic carbonate in which an unsaturated carbon bond is introduced into any portion. Examples of the unsaturated carbon bond cyclic carbonate include vinylene carbonate and vinyl ethylene carbonate. The proportion of the unsaturated carbon bond cyclic carbonate in the nonaqueous solvent is in the range of, for example, 0.01% by weight to 10% by weight.

The nonaqueous solvent preferably contains a sultone (cyclic sulfonate) because the chemical stability of the electrolytic solution is improved. Examples of the sultone include propane sultone and propene sultone. The proportion of the sultone is in the range of, for example, 0.5% by weight to 5% by weight.

The nonaqueous solvent preferably contains an acid anhydride because the chemical stability of the electrolytic solution is improved. Examples of the acid anhydride include carboxylic anhydrides, disulfonic anhydrides, and carboxylic-sulfonic anhydrides. Examples of carboxylic anhydrides include succinic anhydride, glutaric anhydride, and maleic anhydride. Examples of disulfonic anhydrides include ethanedisulfonic anhydride and propanedisulfonic anhydride. Examples of carboxylic-sulfonic anhydrides include sulfobenzoic anhydride, sulfopropionic anhydride, and sulfobutyric anhydride. The proportion of the acid anhydride in the nonaqueous solvent is in the range of, for example, 0.5% by weight to 5% by weight.

The electrolyte salt contains one or two or more light metal salts, such as Li salts. Examples of Li salts include $LiPF_6$, $LiBF_4$, $LiClO_4$, $LiAsF_6$, $LiB(C_6H_5)_4$, $LiCH_3SO_3$, $LiCF_3SO_3$, $LiAlCl_4$, $Li_2SiF_6$, $LiCl$, and $LiBr$. Another Li salt may be used. This is because excellent battery capacity, cyclic characteristics, storage characteristics, and so forth are provided.

Among these compounds, one or two or more of $LiPF_6$, $LiBF_4$, $LiClO_4$, and $LiAsF_6$ are preferred. $LiPF_6$ or $LiBF_4$ is preferred. $LiPF_6$ is more preferred. This is because the internal resistance is reduced to achieve superior characteristics.

The electrolyte salt content is preferably in the range of 0.3 mol/kg to 3.0 mol/kg with respect to the solvent because a high ionic conductivity is provided.

Operation of Secondary Battery

When the prismatic secondary battery is charged, for example, lithium ions released from the positive electrode 21 are occluded in the negative electrode 22 through the electrolytic solution. When the prismatic secondary battery is discharged, for example, lithium ions released from the negative electrode 22 are occluded in the positive electrode 21 through the electrolytic solution.

Method for Producing Secondary Battery

The secondary battery is produced by, for example, a procedure described below.

First, the positive electrode 21 is formed. The positive-electrode active material and, if necessary, the positive-electrode binder, the positive-electrode conductive agent, and so forth are mixed together to form a positive-electrode mixture. The positive-electrode mixture is dispersed in an organic solvent or the like to form a paste-like slurry of the positive-electrode mixture. Next, the paste-like slurry of the positive-electrode mixture is applied to the positive-electrode collector 21A with a coating apparatus, for example, a doctor blade or a bar coater, and dried to form the positive-electrode active material layers 21B. Finally, the positive-electrode active material layers 21B are subjected to compression forming with a roll press or the like while being heated, if necessary. In this case, the compression forming may be repeated plural times.

Next, the negative-electrode active material layers 22B are formed on the negative-electrode collector 22A by a procedure the same as the foregoing procedure for forming the negative electrode 22 for a lithium-ion secondary battery.

Next, the battery element 20 is formed. First, the positive-electrode lead 24 is attached to the positive-electrode collector 21A by a welding method or the like. The negative-electrode lead 25 is attached to the negative-electrode collector 22A by a welding method or the like. Then the positive electrode 21 and the negative electrode 22 are stacked with the separator 23 provided therebetween. The resulting stack is spirally wound in a longitudinal direction. Finally, the resulting spirally wound body is formed so as to have a flattened shape.

Finally, the secondary battery is assembled. First, the battery element 20 is placed in the battery can 11. The insulating plate 12 is placed on the battery element 20. Next, the positive-electrode lead 24 is attached to the positive-electrode pin 15 by a welding method or the like. The negative-electrode lead 25 is attached to the battery can 11 by a welding method or the like. In this case, the battery cover 13 is fixed to an open end portion of the battery can 11 by a laser welding method or the like. Finally, the electrolytic solution is injected into the battery can 11 from the injection hole 19 to impregnate the separator 23 with the electrolytic solution, and then the injection hole 19 is sealed with the sealing member 19A.

Function and Effect of Secondary Battery

For the prismatic secondary battery, the negative electrode 22 has the same structure as that of the foregoing negative electrode for a lithium-ion secondary battery, thereby providing the same effects. It is thus possible to provide excellent battery characteristics, such as cycle characteristics, initial charge-discharge characteristics, and load characteristics. Effects other than these effects are the same as those of the negative electrode for a lithium-ion secondary battery.

2-2. Cylindrical Type

Figure 6:
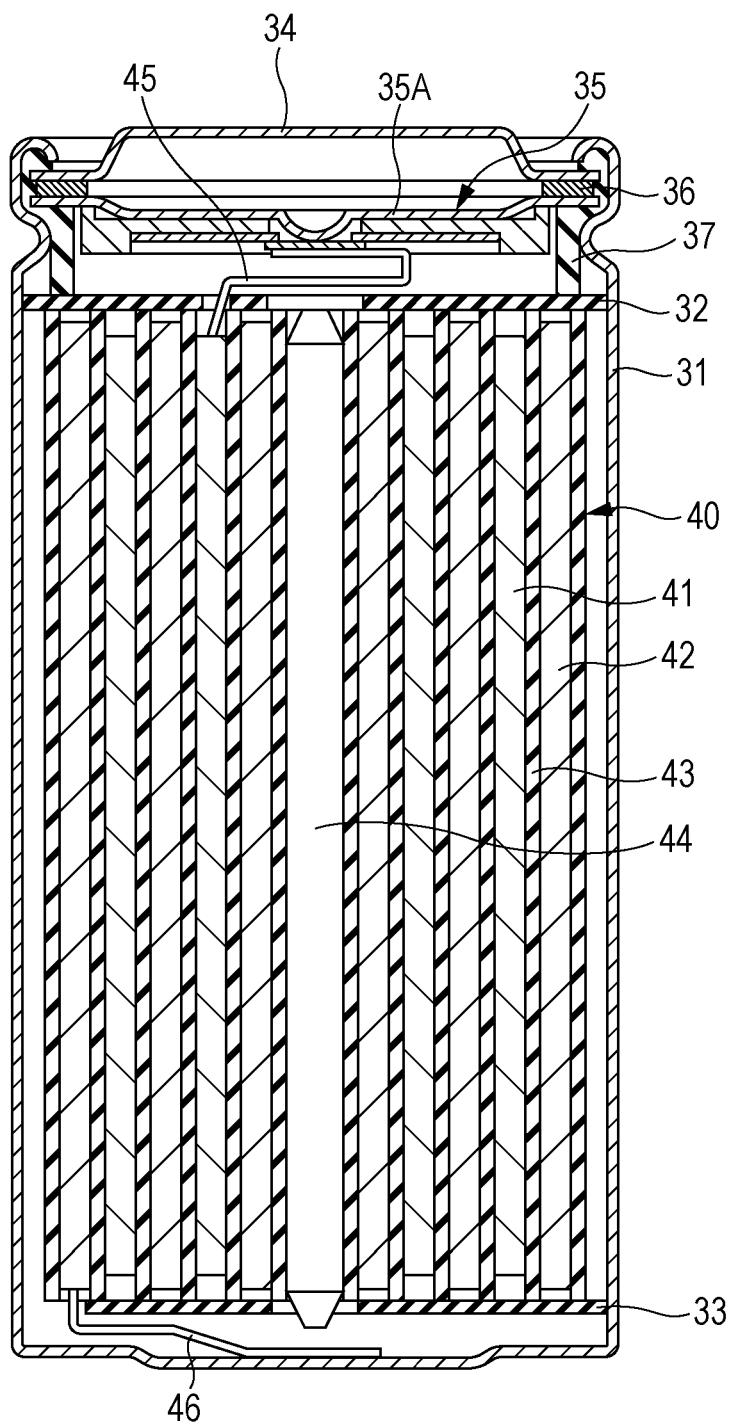
FIG. 6 is a sectional view illustrating a structure of a lithium-ion secondary battery (cylindrical type) according to an embodiment of the present application.
Figure 7:
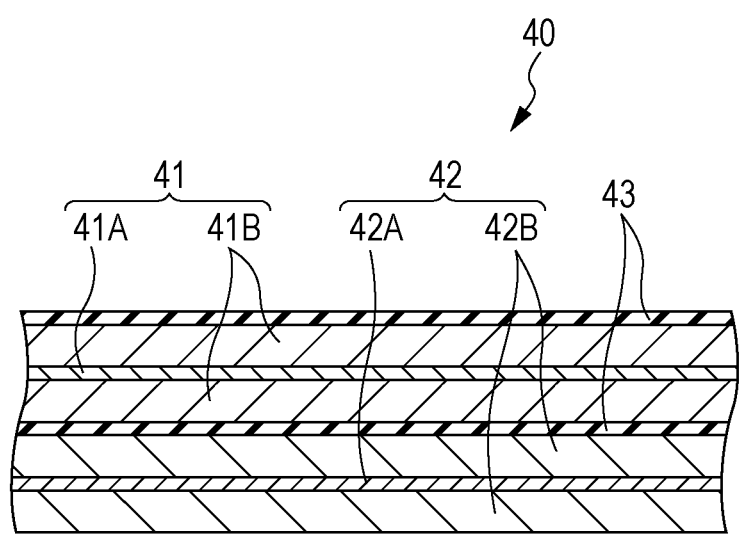
FIG. 7 is a partially enlarged sectional view of a spirally wound electrode illustrated in FIG. 6.

FIGS. 6 and 7 are sectional views illustrating a structure of a cylindrical lithium-ion secondary battery. FIG. 7 is a partially enlarged view of a spirally wound electrode 40 illustrated in FIG. 6. The cylindrical secondary battery will be described below with reference to components of the foregoing prismatic secondary battery, as necessary.

Structure of Secondary Battery

The cylindrical secondary battery mainly includes the spirally wound electrode 40 and a pair of insulating plates 32 and 33 in a substantially hollow cylindrical-shaped battery can 31. The spirally wound electrode 40 is formed of a spirally wound laminate in which a positive electrode 41 and a negative electrode 42 are stacked with a separator 43 provided therebetween and spirally wound.

The battery can 31 has a hollow structure in which an end portion of the battery can 31 is closed and the other end portion thereof is opened. The battery can 31 is composed of, for example, a material the same as that of the battery can 11. The pair of insulating plates 32 and 33 are arranged in such a manner that the spirally wound electrode 40 is sandwiched therebetween at the top and the bottom of the spirally wound electrode body 40 and that the pair of insulating plates 32 and 33 extend in a direction perpendicular to a peripheral winding surface.

In the open end portion of the battery can 31, a battery cover 34, a safety valve mechanism 35, and a positive temperature coefficient device (PTC device) 36 are caulked with a gasket 37. The battery can 31 is sealed. The battery cover 34 is composed of, for example, a material the same as that of the battery can 31. The safety valve mechanism 35 and the positive temperature coefficient device 36 are arranged inside the battery cover 34. The safety valve mechanism 35 is electrically connected to the battery cover 34 through the positive temperature coefficient device 36. In the safety valve mechanism 35, if the internal pressure of the secondary battery is increased to a predetermined value or higher by an internal short-circuit or externally applied heat, a disk plate 35A is reversed to disconnect the electrical connection between the battery cover 34 and the spirally wound electrode 40. The positive temperature coefficient device 36 exhibits an increase in resistance with increasing temperature and thus prevents abnormal heat generation due to a large current. The gasket 37 is composed of, for example, an insulating material. The surface of the gasket 37 may be coated with asphalt.

A center pin 44 may be interposed in the center of the spirally wound electrode 40. A positive-electrode lead 45 composed of a conductive material, such as Al, is connected to the positive electrode 41. A negative-electrode lead 46 composed of a conductive material, such as Ni, is connected to the negative electrode 42. The positive-electrode lead 45 is attached to the safety valve mechanism 35 by welding or the like to establish electrical connection with the battery cover 34. The negative-electrode lead 46 is attached to the battery can 31 by welding or the like to establish electrical connection with the battery can 31.

The positive electrode 41 includes, for example, a positive-electrode active material layer 41B provided on each surface of a positive-electrode collector 41A. The negative electrode 42 has the same structure as the foregoing negative electrode for a lithium-ion secondary battery. For example, the negative electrode 42 includes a negative-electrode active material layer 42B provided on each surface of a negative-electrode collector 42A. The structures of the positive-electrode collector 41A, the positive-electrode active material layers 41B, the negative-electrode collector 42A, the negative-electrode active material layers 42B, and the separator 43 are the same as those of the positive-electrode collector 21A, the positive-electrode active material layers 21B, the negative-electrode collector 22A, the negative-electrode active material layers 22B, and the separator 23, respectively. The composition of an electrolytic solution with which the separator 43 is impregnated is the same as that of the electrolytic solution used in the prismatic secondary battery.

Operation of Secondary Battery

When the cylindrical secondary battery is charged, for example, lithium ions released from the positive electrode 41 are occluded in the negative electrode 42 through the electrolytic solution. When the cylindrical secondary battery is discharged, for example, lithium ions released from the negative electrode 42 are occluded in the positive electrode 41 through the electrolytic solution.

Method for Producing Secondary Battery

The cylindrical secondary battery is produced by, for example, a procedure described below. First, for example, the positive-electrode active material layer 41B is formed on each of the surfaces of the positive-electrode collector 41A to form the positive electrode 41 in the same way as the procedure for forming the positive electrode 21. The negative-electrode active material layer 42B is formed on each of the surfaces of the negative-electrode collector 42A to form the negative electrode 42 in the same way as the procedure for forming the negative electrode 22. Next, the positive-electrode lead 45 is attached to the positive electrode 41 by a welding method or the like. The negative-electrode lead 46 is attached to the negative electrode 42 by a welding method or the like. Then the positive electrode 41 and the negative electrode 42 are stacked with the separator 43 provided therebetween. The resulting stack is spirally wound to form a spirally wound electrode 40. The center pin 44 is inserted into the center of the spirally wound electrode 40. The spirally wound electrode 40 is placed in the battery can 31 while being sandwiched between the pair of insulating plates 32 and 33. In this case, the positive-electrode lead 45 is attached to the safety valve mechanism 35 by a welding method or the like. An end portion of the negative-electrode lead 46 is attached to the battery can 31 by a welding method or the like. Subsequently, the electrolytic solution is injected into the battery can 31, thereby impregnating the separator 43 with the electrolytic solution. Finally, the battery cover 34, the safety valve mechanism 35, and the positive temperature coefficient device 36 are attached to the open end portion of the battery can 31 and then are caulked with the gasket 37.

Function and Effect of Secondary Battery

For the cylindrical secondary battery, the negative electrode 42 has the same structure as that of the foregoing negative electrode for a lithium-ion secondary battery, thereby providing the same effects as those of the prismatic secondary battery.

2-3. Laminated-Film Type

Figure 8:
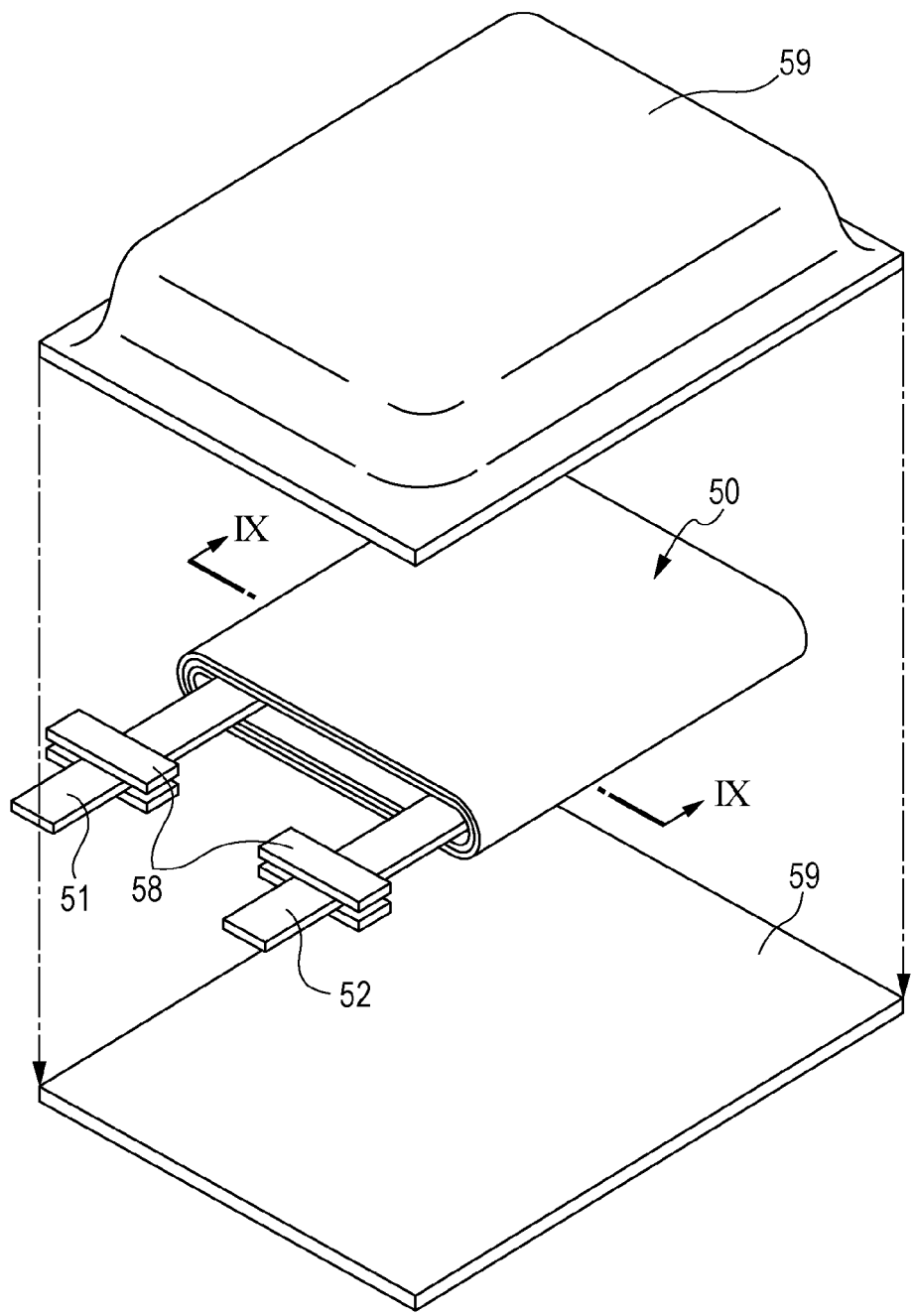
FIG. 8 is an exploded perspective view illustrating a structure of a lithium-ion secondary battery (laminated-film type) according to an embodiment of the present application.
Figure 9:
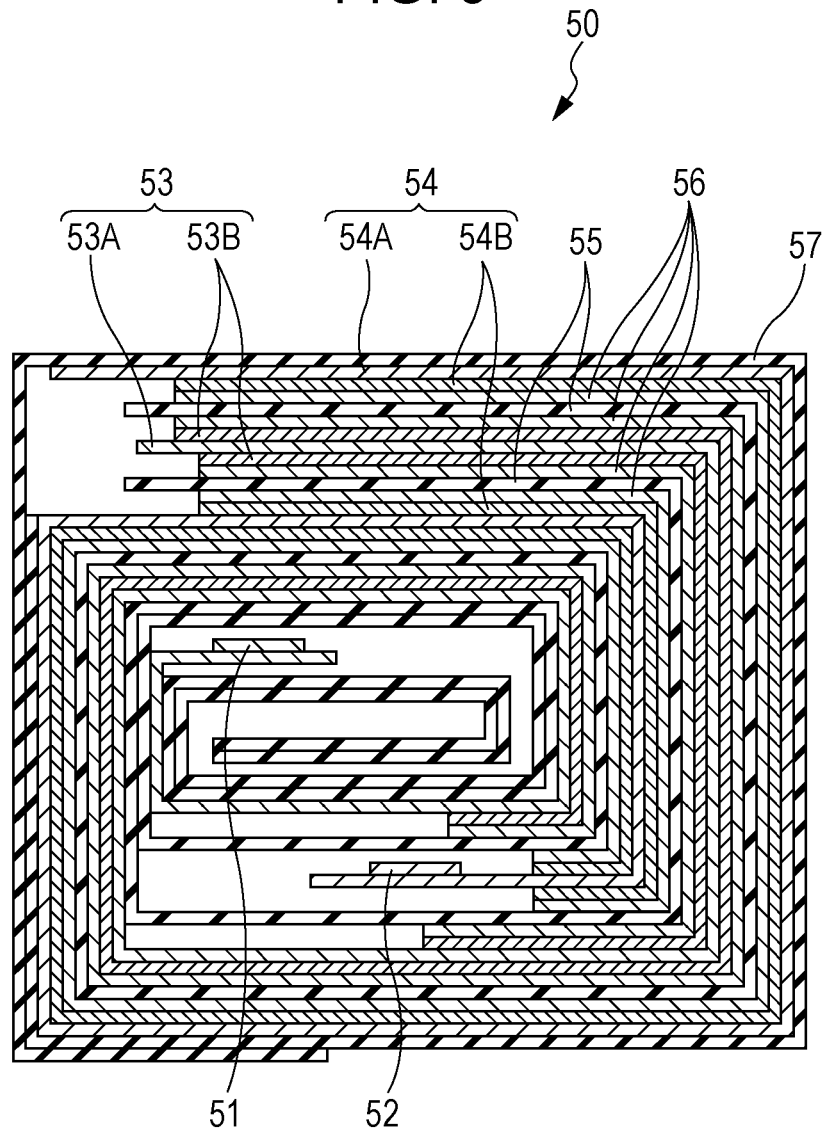
FIG. 9 is an enlarged cross-sectional view taken along line IX-IX in FIG. 8 that illustrates a spirally wound electrode.

FIG. 8 is an exploded perspective view illustrating a structure of a laminated-film-type lithium-ion secondary battery. FIG. 9 is an enlarged cross-sectional view taken along line IX-IX in FIG. 8 that illustrates a spirally wound electrode 50.

Structure of Secondary Battery

The laminated-film-type secondary battery mainly includes the spirally wound electrode 50 in film-shaped package members 59. The spirally wound electrode 50 is formed of a spirally wound laminate in which a positive electrode 53 and a negative electrode 54 are stacked with separators 55 and electrolyte layers 56 provided therebetween and spirally wound. A positive-electrode lead 51 is attached to the positive electrode 53. A negative-electrode lead 52 is attached to the negative electrode 54. The outermost portion of the spirally wound electrode 50 is protected by a protective tape 57.

For example, the positive-electrode lead 51 and the negative-electrode lead 52 extend from the inside to the outside of the package members 59 in one direction. The positive-electrode lead 51 is composed of a conductive material, e.g., Al. The negative-electrode lead 52 is composed of a conductive material, e.g., Cu, Ni, stainless steel. These materials each have a sheet shape or a mesh shape.

For example, each of the package members 59 is formed of a laminated film in which a bonding layer, a metal layer, and a surface protective layer are stacked in that order. For the laminated films, for example, peripheral portions of the bonding layers of two laminated films are bonded together by fusion bonding or with an adhesive in such a manner that the bonding layers face the spirally wound electrode 50. Each of the bonding layers is formed of a film of polyethylene, polypropylene, or the like. The metal layer is formed of Al foil or the like. The surface protective layer is formed of a film of nylon, polyethylene terephthalate, or the like.

In particular, as each package member 59, an aluminum-laminated film in which a polyethylene film, aluminum foil, and a nylon film are stacked in that order is preferred. However, each package member 59 may be formed of a laminated film having another stacking structure. Alternatively, each package member 59 may be formed of a polymer film of polypropylene or a metal film.

Contact films 58 configured to prevent the entry of outside air are arranged between the positive-electrode lead 51 and the package members 59 and between the negative-electrode lead 52 and the package members 59. Each of the contact films 58 is composed of a material adhesive to the positive-electrode lead 51 and the negative-electrode lead 52. Examples of the material include polyolefin resins, such as polyethylene, polypropylene, modified polyethylene, and modified polypropylene.

The positive electrode 53 includes, for example, a positive-electrode active material layer 53B provided on each surface of a positive-electrode collector 53A. The negative electrode 54 has the same structure as the foregoing negative electrode for a lithium-ion secondary battery. For example, the negative electrode 54 includes a negative-electrode active material layer 54B provided on each surface of a negative-electrode collector 54A. The structures of the positive-electrode collector 53A, the positive-electrode active material layers 53B, the negative-electrode collector 54A, and the negative-electrode active material layers 54B are the same as those of the positive-electrode collector 21A, the positive-electrode active material layers 21B, the negative-electrode collector 22A, and the negative-electrode active material layers 22B, respectively. The structure of each of the separators 55 is the same as that of the separator 23.

Each of the electrolyte layers 56 is formed of a component in which an electrolytic solution is held by a polymeric compound. Each electrolyte layer 56 may contain additional material, such as an additive, if necessary. The electrolyte layer 56 is composed of what is called a gel-like electrolyte. The gel-like electrolyte is preferred because a high ionic conductivity (e.g., 1 mS/cm or more at room temperature) is obtained and the leakage of the electrolytic solution from the battery is prevented.

The polymeric compound contains one or two or more compounds described below. Examples thereof include polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, polymethyl methacrylate, polyacrylic acid, polymethacrylic acid, styrene-butadiene rubber, nitrile-butadiene rubber, polystyrene, polycarbonate, and copolymers of vinylidene fluoride and hexafluoropropylene. Among these compounds, polyvinylidene fluoride or copolymers of vinylidene fluoride and hexafluoropropylene are preferred because of their good electrochemical stability.

For example, the electrolytic solution has the same composition as the composition of the electrolytic solution used in the prismatic secondary battery. However, in the electrolyte layers 56 composed of a gel-like electrolyte, the solvent of the electrolytic solution indicates a wide concept including not only a liquid solvent but also a material which is capable of dissociating an electrolyte salt and which has ionic conductivity. Thus, in the case where a polymeric compound having ionic conductivity is used, the polymeric compound is included in the concept of the solvent.

Instead of the gel-like electrolyte layers 56, an electrolytic solution may be used. In this case, the separators 55 are impregnated with the electrolytic solution.

Operation of Secondary Battery

When the laminated-film-type secondary battery is charged, lithium ions released from the positive electrode 53 are occluded in the negative electrode 54 through the electrolyte layers 56. When the laminated-film-type secondary battery is discharged, lithium ions released from the negative electrode 54 are occluded in the positive electrode 53 through the electrolyte layers 56.

Method for Producing Secondary Battery

The laminated-film-type secondary battery including the gel-like electrolyte layers 56 is produced by, for example, three types of procedures described below.

In a first procedure, first, the positive electrode 53 and the negative electrode 54 are formed in the same ways as the procedures for forming the positive electrode 21 and the negative electrode 22. In this case, the positive-electrode active material layer 53B is formed on each surface of the positive-electrode collector 53A to form the positive electrode 53. The negative-electrode active material layer 54B is formed on each of the surfaces of the negative-electrode collector 54A to form the negative electrode 54. Next, a precursor solution including an electrolytic solution, a polymer compound, an organic solvent, and the like is prepared. The precursor solution is applied to the positive electrode 53 and the negative electrode 54 to form the gel-like electrolyte layers 56. Then the positive-electrode lead 51 is attached to the positive-electrode collector 53A by a welding method or the like. The negative-electrode lead 52 is attached to the negative-electrode collector 54A by a welding method or the like. Subsequently, the positive electrode 53 and the negative electrode 54 including the electrolyte layers 56 are stacked with the separators 55 and spirally wound to form the spirally wound electrode 50. The protective tape 57 is bonded to the outermost portion of the spirally wound electrode 50. Finally, the spirally wound electrode 50 is sandwiched between two film-shaped package members 59. The peripheral portions of the package members 59 are bonded together by a heat fusion method or the like to seal the spirally wound electrode 50 in the package members 59. In this case, the contact films 58 are interposed between the positive-electrode lead 51 and the package members 59 and between the negative-electrode lead 52 and the package members 59.

In a second procedure, first, the positive-electrode lead 51 is attached to the positive electrode 53. The negative-electrode lead 52 is attached to the negative electrode 54. Next, the positive electrode 53 and the negative electrode 54 are stacked with the separators 55 provided therebetween and spirally wound to form a spirally wound component serving as a precursor of the spirally wound electrode 50. The protective tape 57 is bonded to the outermost portion of the spirally wound component. Then the spirally wound component is sandwiched between two film-shaped package members 59. The peripheral portions except for a peripheral portion on one side are bonded by a heat fusion method or the like to accommodate the spirally wound component in the pouch-like package members 59. Next, an electrolytic composition containing an electrolytic solution, a monomer serving as a raw material of a polymeric compound, a polymerization initiator, and, optionally, an additional material, such as a polymerization inhibitor, is prepared. The resulting electrolytic composition is injected into the pouch-like package members 59. The opening portion of the package members 59 is sealed by a heat fusion method or the like. Finally, the monomer is thermally polymerized to form a polymeric compound, thereby resulting in the gel-like electrolyte layers 56.

In a third procedure, first, a spirally wound component is formed and accommodated in the pouch-like package members 59 in the same way as the second procedure, except that the separators 55 each having both surfaces coated with a polymeric compound is used. Examples of the polymeric compound applied to the separators 55 include polymers from vinylidene fluoride (homopolymers, copolymers, and multi-component copolymers). Specific examples thereof include polyvinylidene fluoride; two-component copolymers of vinylidene fluoride and hexafluoropropylene; and three-component copolymers of vinylidene fluoride, hexafluoropropylene, and chlorotrifluoroethylene. In combination with a polymer from vinylidene fluoride, one or two or more other polymeric compounds may be used. Next, the electrolytic solution is prepared and injected into the package members 59. The opening portion of the package members 59 is sealed by a heat fusion method or the like. Finally, the package members 59 are heated under load to bring the separators 55 into close contact with the positive electrode 53 and the negative electrode 54 with the polymeric compound. Thus, the polymeric compound is impregnated with the electrolytic solution. Thereby, the polymeric compound gels to form the electrolyte layers 56.

In the third procedure, swelling of the battery is suppressed, compared with the first procedure. A negligible amount of a monomer serving as a raw material for the polymeric compound, an organic solvent, or the like is left, compared with the second procedure, thereby satisfactorily controlling a step of forming the polymeric compound. Thus, the electrolyte layers 56 have sufficient adhesion to the positive electrode 53, the negative electrode 54, and the separators 55.

Function and Effect of Secondary Battery

For the laminated-film-type secondary battery, the negative electrode 54 has the same structure as that of the foregoing negative electrode for a lithium-ion secondary battery, thereby providing the same effects as those of the prismatic secondary battery.

3. Application of Lithium-Ion Secondary Battery

Application examples of the foregoing lithium-ion secondary battery will be described below.

The application of the lithium-ion secondary battery is not particularly limited as long as the lithium-ion secondary battery is applied to machines, devices, appliances, apparatuses, systems (combinations of a plurality of devices), and the like which can use the lithium-ion secondary battery as a power source for operation or a power storage source for accumulation of power. In the case where the lithium-ion secondary battery is used as a power source, the power source may be used as a main power source (a power source to be preferentially used) or an auxiliary power source (a power source to be used instead of the main power source or by switching from the main power source). The type of the main power source is not limited to the lithium-ion secondary battery.

The lithium-ion secondary battery is applied to, for example, the following applications. Examples of the applications include portable electronic devices, such as video cameras, digital still cameras, cellular phones, notebook personal computers, cordless telephones, headphone stereos, portable radios, portable television sets, and personal digital assistants; portable home appliances, such as electric shavers; backup power sources; storage devices, such as memory cards; electric tools, such as electric drills and electric saws; battery packs used as power sources for notebook personal computers and so forth; medical electronic devices, such as pacemakers and hearing aids; vehicles, such as electric vehicles (including hybrid vehicles); and energy storage systems, such as household battery systems storing power in case of emergency or the like. The lithium-ion secondary battery may be applied to applications other than the foregoing applications.

In particular, the lithium-ion secondary battery is effectively applied to, for example, a battery pack, an electric vehicle, a power storage system, an electric tool, or an electronic device. This is because such an application demands excellent battery characteristics; hence, the use of the lithium-ion secondary battery according to an embodiment of the present application effectively improves the characteristics. The battery pack refers to a power source including the lithium-ion secondary batteries and is what is called a set of batteries or the like. The electric vehicle refers to a vehicle that operates (runs) using the lithium-ion secondary battery as a power source for operation. As described above, the electric vehicle may include a vehicle (e.g., a hybrid vehicle) with a driving source in addition to the lithium-ion secondary battery. The power storage system refers to a system including the lithium-ion secondary battery as a power storage source. For example, in a household energy storage system, electric power is stored in the lithium-ion secondary battery serving as a power storage source. Electric power is consumed when necessary, so home appliances can be used. The electric tool refers to a tool having a moving part (such as a drill) that is movable using the lithium-ion secondary battery as a power source for operation. The electronic device refers to a device that performs various functions using the lithium-ion secondary battery for operation.

Some application examples of the lithium-ion secondary battery will be specifically described below. Configurations of the application examples described below are merely examples and thus can be appropriately changed.

3-1. Battery Pack

Figure 10:
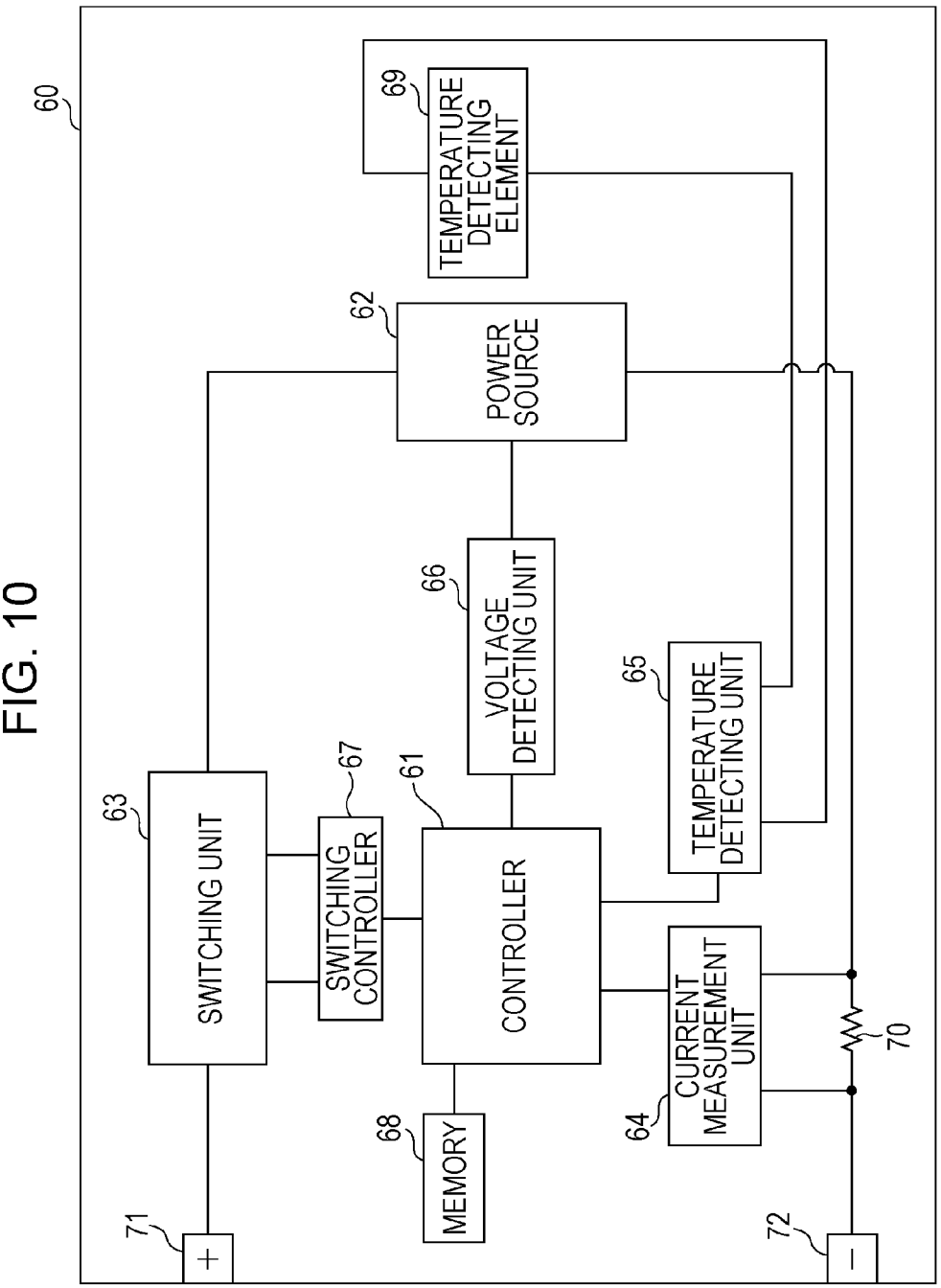
FIG. 10 is a block diagram illustrating the configuration of an application example (battery pack) of a lithium-ion secondary battery.

FIG. 10 illustrates a block configuration of a battery pack. For example, as illustrated in FIG. 10, the battery pack includes a controller 61, a power source 62, a switching unit 63, a current measurement unit 64, a temperature detecting unit 65, a voltage detecting unit 66, a switching controller 67, a memory 68, a temperature detecting element 69, a current detecting resistance 70, a positive-electrode terminal 71, and a negative-electrode terminal 72 in a housing 60 composed of, for example, a plastic material.

The controller 61 controls the overall operation of the battery pack (including the usage state of the power source 62) and includes, for example, a central processing unit (CPU). The power source 62 includes one or two or more lithium-ion secondary batteries (not illustrated). The power source 62 refers to, for example, a set of batteries including two or more lithium-ion secondary batteries. These lithium-ion secondary batteries may be connected in series, in parallel, or in combination thereof. For example, the power source 62 includes six lithium-ion secondary batteries in which three sets of two batteries connected in parallel are connected in series.

The switching unit 63 is configured to switch the usage state of the power source 62 (availability of connection between the power source 62 and external equipment) in response to instructions from the controller 61. The switching unit 63 includes, for example, a charge control switch, a discharge control switch, a diode for charge, and a diode for discharge (all elements are not illustrated). Examples of the charge control switch and the discharge control switch include semiconductor switches formed of, for example, metal oxide semiconductor field-effect transistors (MOSFETs).

The current measurement unit 64 is configured to measure a current with the current detecting resistance 70 and to send the measurement results to the controller 61. The temperature detecting unit 65 is configured to measure a temperature with the temperature detecting element 69 and to send the measurement results to the controller 61. For example, the temperature measurement results are used when the controller 61 controls charge and discharge at the time of abnormal heat generation and when the controller 61 performs correction at the time of the calculation of remaining battery capacity. The voltage detecting unit 66 is configured to measure the voltage of the lithium-ion secondary batteries in the power source 62, subject the measured voltage to analog-to-digital (A/D) conversion, and send the resulting digital output to the controller 61.

The switching controller 67 is configured to control the operation of the switching unit 63 in response to signals from the current measurement unit 64 and the voltage detecting unit 66.

The switching controller 67 controls the switching unit 63 in such a manner that, for example, when the battery voltage reaches an overcharge detection voltage, the switching unit 63 (charge control switch) is disconnected so as not to allow a charging current to flow through the current path of the power source 62. This permits the power source 62 only to discharge with the diode for discharge. For example, the switching controller 67 is configured to interrupt a charging current when a large current flows during charging.

Furthermore, the switching controller 67 controls the switching unit 63 in such a manner that, for example, when the battery voltage reaches an over-discharge detection voltage, the switching unit 63 (discharge control switch) is disconnected so as not to allow a discharge current to flow through the current path of the power source 62. This permits the power source 62 only to charge with the diode for charge. For example, the switching controller 67 is configured to interrupt a discharge current when a large current flows during discharging.

In the lithium-ion secondary battery, for example, the overcharge detection voltage is 4.20 V±0.05 V, and the over-discharge detection voltage is 2.4 V±0.1 V.

An example of the memory 68 is electrically erasable programmable read-only memory (EEPROM), which is non-volatile memory. For example, the memory 68 stores a numerical value calculated by the controller 61 and information about the lithium-ion secondary batteries (for example, initial internal resistance) measured in the production process. In the case where the full charge capacity of the lithium-ion secondary batteries is stored in the memory 68, the controller 61 can obtain information about remaining capacity and so forth.

The temperature detecting element 69 is configured to measure the temperature of the power source 62 and to send the measurement results to the controller 61. An example of the temperature detecting element 69 is a thermistor.

The positive-electrode terminal 71 and the negative-electrode terminal 72 are terminals for connection to external equipment (e.g., a notebook personal computer) operated by the battery pack or to external equipment (e.g., a charger) used to charge the battery pack. The charge and discharge of the power source 62 are performed through the positive-electrode terminal 71 and the negative-electrode terminal 72.

3-2. Electric Vehicle

Figure 11:
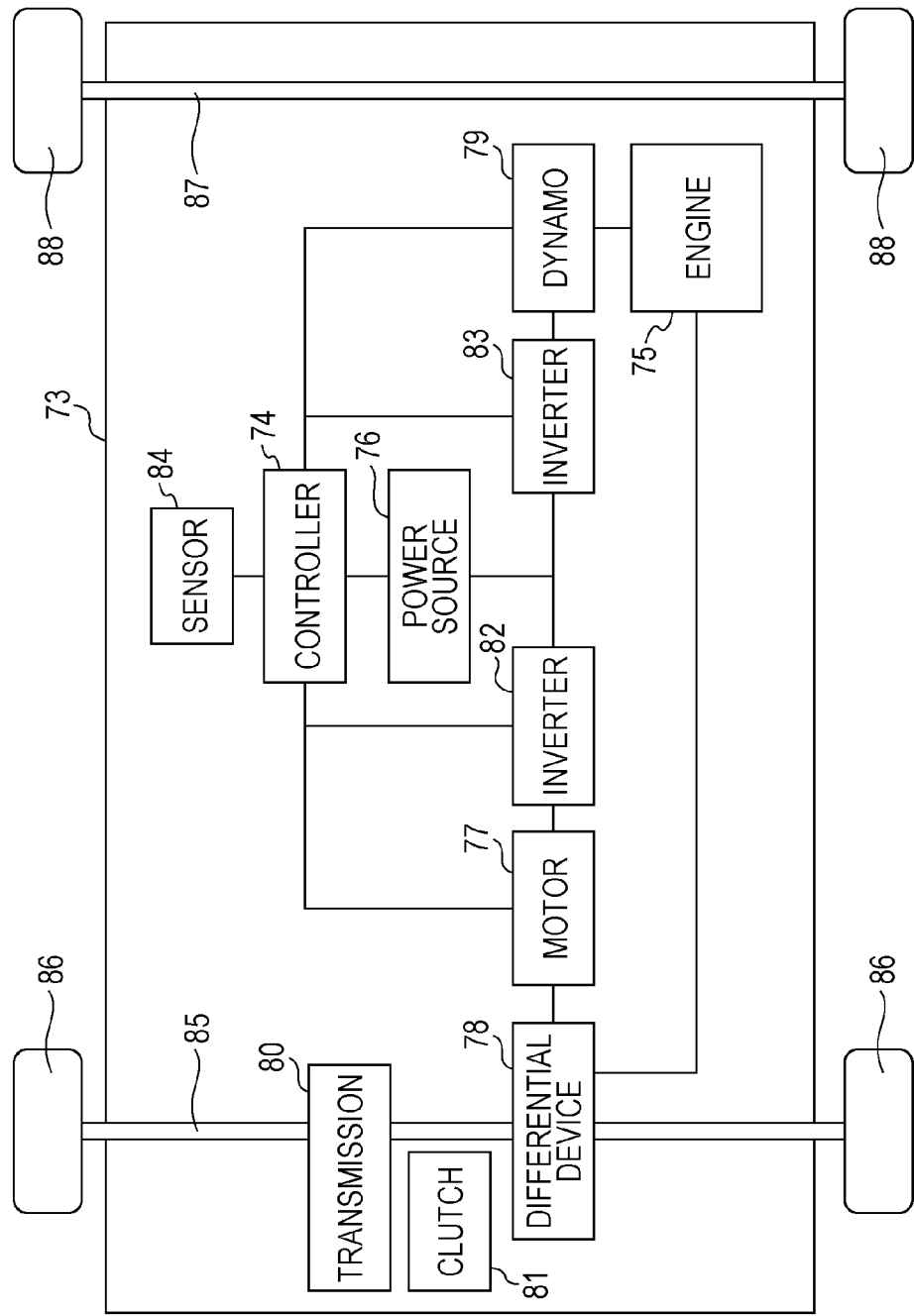
FIG. 11 is a block diagram illustrating the configuration of an application example (electric vehicle) of a lithium-ion secondary battery.

FIG. 11 illustrates a block configuration of a hybrid vehicle as an example of an electric vehicle. For example, as illustrated in FIG. 11, the electric vehicle includes a controller 74, an engine 75, a power source 76, a driving motor 77, a differential device 78, a dynamo 79, a transmission 80, a clutch 81, inverters 82 and 83, and various sensors 84 in a metal chassis 73. The electric vehicle further includes, for example, an axle shaft 85 for front wheels, the axle shaft 85 being connected to the differential device 78 and the transmission 80, front wheels 86, an axle shaft 87 for rear wheels, and rear wheels 88.

The electric vehicle can run using any one of the engine 75 and the motor 77 as a driving source. The engine 75 serves as a main driving source, such as a gasoline engine. In the case where the engine 75 is used as a driving source, for example, the driving force (torque) of the engine 75 is transmitted to the front wheels 86 or the rear wheels 88 through the differential device 78, the transmission 80, and clutch 81 serving as drive members. The torque of the engine 75 is also transmitted to the dynamo 79 and allows the dynamo 79 to generate alternating-current (AC) power. The AC power is converted into direct-current (DC) power by the inverter 83. The resulting DC power is stored in the power source 76. Meanwhile, in the case where the motor 77 serving as a convertor is used as a driving source, power (DC power) supplied from the power source 76 is converted into AC power by the inverter 82. The motor 77 is driven by the AC power. The driving force (torque) obtained by conversion of electric power using the motor 77 is transmitted to, for example, the front wheels 86 or the rear wheels 88 through the differential device 78, the transmission 80, and clutch 81 serving as drive members.

When the electric vehicle slows down with a brake mechanism (not illustrated), the resistance during the slowing down may be transmitted to the motor 77 in the form of torque, and the motor 77 may generate AC power using the torque. Preferably, the resulting AC power is converted into DC power by the inverter 82, and the regenerative DC power is stored in the power source 76.

The controller 74 controls the operation of the overall electric vehicle and includes, for example, a central processing unit (CPU). The power source 76 includes one or two or more lithium-ion secondary batteries (not illustrated). The power source 76 may be configured to be capable of storing power by establishing connection with an external power source and receiving power from the external power source. For example, the various sensors 84 are used to control the number of revolutions of the engine 75 and to control the position (throttle position) of a throttle valve (not illustrated). The various sensors 84 include, for example, a speed sensor, an acceleration sensor, and an engine speed sensor.

As described above, the hybrid vehicle has been described as an electric vehicle. The electric vehicle may be a vehicle (electric vehicle) operated by the power source 76 and the motor 77 without the engine 75.

3-3. Power Storage System

Figure 12:
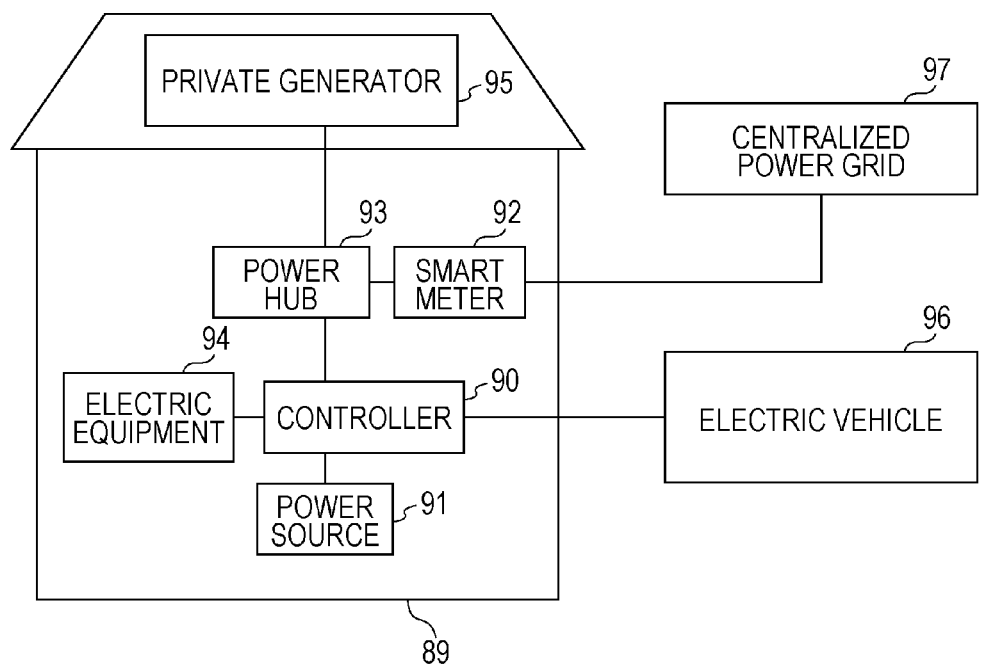
FIG. 12 is a block diagram illustrating the configuration of an application example (power storage system) of a lithium-ion secondary battery.

FIG. 12 illustrates a block configuration of a power storage system. For example, as illustrated in FIG. 12, the power storage system includes a controller 90, a power source 91, a smart meter 92, and a power hub 93 in a house 89, e.g., a general house or commercial building.

Here, for example, the power source 91 is connected to electric equipment 94 installed in the house 89 and can be connected to an electric vehicle 96 parked outside the house 89. Furthermore, for example, the power source 91 is connected to a private generator 95 mounted on the house 89 via the power hub 93 and can be connected to an external centralized power grid 97 via the smart meter 92 and the power hub 93.

The electric equipment 94 includes one or two or more home appliances, such as refrigerators, television sets, and water heaters. The private generator 95 includes one or two or more generators, such as solar photovoltaic generators and wind generators. The electric vehicle 96 includes one or two or more vehicles, such as electric vehicles, electric motorcycles, and hybrid vehicles. The centralized power grid 97 includes one or two or more power grids connected to, for example, thermal power plants, nuclear power plants, hydroelectric power stations, and wind farms.

The controller 90 controls the operation of the overall power storage system (including the usage state of the power source 91) and includes, for example, a CPU. The power source 91 includes one or two or more lithium-ion secondary batteries (not illustrated). The smart meter 92 is, for example, a network-ready electrical meter installed in the house 89, which is on the power demand side and can communicate with the power supply side. Thus, for example, the smart meter 92 is configured to control a balance between supply and demand in the house 89 while communicating with the outside, if necessary, thereby efficiently and stably supplying energy.

In this power storage system, for example, power is stored in the power source 91 from the centralized power grid 97, which is an external power source, via the smart meter 92 and the power hub 93. Furthermore, power is stored in the power source 91 from the private generator 95, which is an independent power source, via the power hub 93. The power stored in the power source 91 is supplied to the electric equipment 94 or the electric vehicle 96, if necessary, in response to instructions from the controller 90. Thus, the electric equipment 94 can be operated, and the electric vehicle 96 can be charged. That is, the power storage system is a system capable of storing and supplying power in the house 89 using the power source 91.

Power stored in the power source 91 can be desirably used. For example, power can be stored in the power source 91 from the centralized power grid 97 during late-night hours in which the market price of electricity is low. The power stored in the power source 91 can be used during daytime hours in which the market price of electricity is high.

The foregoing power storage system may be installed for each house (family) or may be installed for each set of a plurality of houses (a plurality of families).

3-4. Electric Tool

Figure 13:
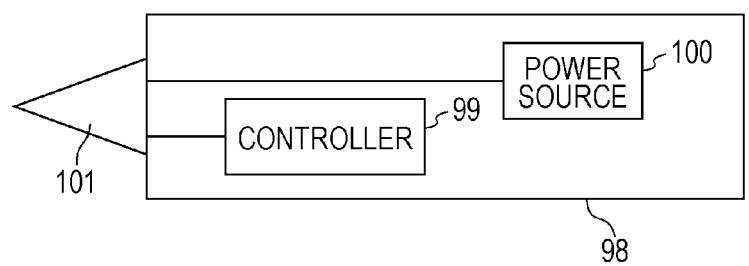
FIG. 13 is a block diagram illustrating the configuration of an application example (electric tool) of a lithium-ion secondary battery.

FIG. 13 illustrates a block configuration of an electric tool. For example, as illustrated in FIG. 13, the electric tool is an electric drill that includes a controller 99 and a power source 100 in a main body 98 composed of, for example, a plastic material. For example, a drill portion 101, which is a moving part, is rotatably attached to the main body 98.

The controller 99 controls the overall operation of the electric tool (including the usage state of the power source 100) and includes, for example, a CPU. The power source 100 includes one or two or more lithium-ion secondary batteries (not illustrated). The controller 99 is configured to appropriately supply power from the power source 100 to the drill portion 101 in response to the operation of an operation switch (not illustrated) to drive the drill portion 101.

EXAMPLES

Examples of the present application will be described in detail below.

Experimental Example 1-1 to 1-9

Laminated-film-type secondary batteries illustrated in FIGS. 8 and 9 were produced by a procedure described below.

The positive electrode 53 was formed. First, 91 parts by mass of a positive-electrode active material ($LiCoO_2$), 6 parts by mass of a positive-electrode conductive agent (graphite), and 3 parts by mass of a positive-electrode binder (polyvinylidene fluoride: PVDF) were mixed together to form a positive-electrode mixture. The positive-electrode mixture was dispersed in an organic solvent (N-methyl-2-pyrrolidone: NMP) to form a paste-like slurry of the positive-electrode mixture. Then the slurry of the positive-electrode mixture was applied to both surface of the positive-electrode collector 53A with a coating apparatus and dried to form the positive-electrode active material layers 53B. As the positive-electrode collector 53A, strip-shaped aluminum foil (thickness: 12 μm) was used. Finally, the positive-electrode active material layers 53B were subjected to compression forming with a roll press. The thickness of each of the positive-electrode active material layers 53B was adjusted so as to prevent the deposition of metallic Li on the negative electrode 54 in a fully charged state.

Next, the negative electrode 54 was formed. First, a core portion ($SiO_x$) was formed by a gas atomization method. A single-layer covering portion ($SiO_y$+M1 (Ni)) was formed on a surface of the core portion by a powder evaporation method. The compositions of the core portion and the covering portion (atomic ratios x and y, ratio (M1/(Si+O))) were described in Table 1. In this case, the core portion had a half-width of 0.6°, a crystallite size of 90 nm, and a median diameter of 4 μm. The covering portion had an average thickness of 200 nm and an average coverage of 70%.

When the core portion was formed, the oxygen flow rate was adjusted during the melt-solidification of the raw material (Si) to control the composition (atomic ratio x). When the covering portion was formed, powdered $SiO_y$ and powdered metal M1 were co-deposited. During the deposition of the raw materials, the flow rate of $O_2$ or $H_2$ was adjusted to control the composition (atomic ratio y). Simultaneously, the input power was adjusted to control the ratio (M1/(Si+O)). In the powder evaporation method, a deflective electron beam evaporation source was used. The raw material Si powder had a median diameter of 0.2 μm to 30 μm. The deposition rate was 2 nm/sec. A vacuum state, i.e., a pressure of $1\times10^{-3}$ Pa, was used with a turbo-molecular pump.

Next, a negative-electrode active material and a precursor of a negative-electrode binder were mixed together in a dry weight ratio of 90:10. The resulting mixture was diluted with NMP to form a paste-like slurry of a negative-electrode mixture. In this case, a polyamic acid containing NMP and N,N-dimethylacetamide (DMAC) was used. Then the slurry of the negative-electrode mixture was applied to both surface of the negative-electrode collector 54A with a coating apparatus and dried. As the negative-electrode collector 54A, rolled Cu foil (thickness: 15 μm, ten-point height of irregularities Rz<0.5 μm) was used. Finally, in order to enhance binding properties, the resulting coating films were hot-pressed and baked in a vacuum atmosphere at 400° C. for 1 hour. Thereby, the negative-electrode binder (polyamide-imide) was formed, thus resulting in the negative-electrode active material layers 54B containing the negative-electrode active material and the negative-electrode binder. The thickness of each of the negative-electrode active material layers 54B was adjusted in such a manner that the negative-electrode utilization factor was 65%.

Next, an electrolyte salt ($LiPF_6$) was dissolved in a mixed solvent (ethylene carbonate (EC) and diethyl carbonate (DEC)) to prepare an electrolytic solution. In this case, with respect to the composition of the mixed solvent, the ratio by weight of EC to DEC was 50 to 50, and the proportion of the electrolyte salt was 1 mol/kg with respect to the mixed solvent.

Finally, the secondary battery was assembled. First, the positive-electrode lead 51 composed of Al was welded to an end of the positive-electrode collector 53A. The negative-electrode lead 52 composed of Ni was welded to an end of the negative-electrode collector 54A. Next, the positive electrode 53, the separator 55, the negative electrode 54, and the separator 55 were stacked in that order. The resulting stack was spirally wound in a longitudinal direction to form a spirally wound component serving as a precursor of the spirally wound electrode 50. The outermost portion of the spirally wound component was fixed with the protective tape 57 (adhesive tape). In this case, as each of the separators 55, a laminated film (thickness: 20 μm) in which a film mainly containing porous polyethylene was sandwiched between films mainly composed of porous polypropylene was used. Next, the spirally wound component was sandwiched between the package members 59. The peripheral portions except for a peripheral portion on one side were bonded by heat fusion to accommodate the spirally wound component in the pouch-like package members 59. In this case, as each of the package members 59, an aluminum-laminated film in which a nylon film (thickness: 30 μm), Al foil (thickness: 40 μm), and a non-stretched polypropylene film (thickness: 30 μm) were stacked in that order from the outside was used. Then the electrolytic solution was injected from an opening portion of the package members 59 to impregnate the separators 55 with the electrolytic solution, thereby forming the spirally wound electrode 50. Finally, the opening portion of the package members 59 was sealed by heat fusion in a vacuum atmosphere.

The cycle characteristics, the initial charge-discharge characteristics, and the load characteristics of the secondary batteries were investigated. Table 1 illustrates the results.

In the case where the cycle characteristics were investigated, first, one charge-discharge cycle was performed in an atmosphere with a temperature of 23° C. in order to stabilize the battery state. Subsequently, another charge-discharge cycle was performed to measure the discharge capacity. Next, the charge-discharge cycle was repeated until the number of cycles reached 100 cycles, and then the discharge capacity was measured. Finally, the cycle retention rate was calculated from the following expression: cycle retention rate (%)=(discharge capacity at 100th cycle/discharge capacity at second cycle)×100. In the case of charging, each secondary battery was charged at a constant current density of 3 $mA/cm^2$ until the voltage reached 4.2 V, and then the battery was charged at a constant voltage of 4.2 V until the current density reached 0.3 $mA/cm^2$. In the case of discharging, the battery was discharged at a constant current density of 3 $mA/cm^2$ until the voltage reached 2.5 V.

In the case where the initial charge-discharge characteristics were investigated, first, one charge-discharge cycle was performed in order to stabilize the battery state. Subsequently, each secondary battery was charged again to measure the charge capacity. Then the battery was discharged to measure the discharge capacity. Finally, the initial efficiency was calculated from the following expression: initial efficiency (%)=(discharge capacity/charge capacity)×100. The atmospheric temperature and charge-discharge conditions were the same as those in the case of investigating the cycle characteristics.

In the case of investigating the load characteristics, first, one charge-discharge cycle was performed in order to stabilize the battery state. Subsequently, the second cycle of the charge-discharge operation was performed to measure the discharge capacity. Then the third cycle of the charge-discharge operation was performed to measure the discharge capacity. Finally, the load retention rate was calculated from the following expression: load retention rate (%)=(discharge capacity at third cycle/discharge capacity at second cycle)×100. The atmospheric temperature and charge-discharge conditions were the same as those in the case of investigating the cycle characteristics, except that the discharge current density at the second cycle was changed to 0.2 $mA/cm^2$ and the discharge current density at the third cycle was changed to 1 $mA/cm^2$.

TABLE 1

| Experimental example | Core portion Composition | x | Covering portion Composition | y | M1 | Proportion (at. %) | Cycle retention rate (%) | Initial efficiency (%) | Load retention rate (%) |
|---|---|---|---|---|---|---|---|---|---|
| 1-1 | $SiO_x$ | 0.1 | $SiO_y$ | 1.2 | Ni | 1 | 80.1 | 80.2 | 94.0 |
| 1-2 | | | | | | 5 | 82.2 | 82.2 | 96.0 |
| 1-3 | | | | | | 10 | 84.0 | 83.6 | 97.0 |
| 1-4 | | | | | | 20 | 85.0 | 84.0 | 97.5 |
| 1-5 | | | | | | 30 | 84.0 | 83.2 | 98.0 |
| 1-6 | | | | | | 50 | 83.5 | 82.5 | 98.0 |
| 1-7 | | | | | | 60 | 82.0 | 81.5 | 98.0 |
| 1-8 | $SiO_x$ | 0.1 | — | — | — | — | 33.0 | 85.0 | 98.0 |
| 1-9 | $SiO_x$ | 0.1 | $SiO_y$ | 1.2 | — | — | 75.5 | 78.5 | 92.0 |

In the case where the covering portion (Si+O+Ni) was formed on the surface of the core portion (Si+O), the cycle retention rate was significantly increased while maintaining high initial efficiency and a high load retention rate, as compared with the cases where the covering portion was not formed and where the covering portion did not contain Ni.

Specifically, the formation of the covering portion (Si+O) on the surface of the core portion (Si+O) resulted in a significant increase in cycle retention rate but resulted in reductions in initial efficiency and load retention rate, as compared with the case of the absence of the covering portion. In contrast, the formation of the covering portion (Si+O+Ni) on the surface of the core portion (Si+O) resulted in a further increase in cycle retention rate while maintaining an initial efficiency exceeding 80% and a load retention rate exceeding 90%, as compared with the case of the absence of the covering portion. The advantageous tendency to a further increase in cycle retention rate while minimizing reductions in initial efficiency and load retention rate is a specific tendency first accomplished by the formation of the covering portion (Si+O+Ni).

In particular, in the case where the covering portion (Si+O+Ni) was formed, an M1 ratio of 50 atomic percent or less resulted in inhibition of a reduction in battery capacity, thus providing a high battery capacity. In this case, an M1 ratio of 20 atomic percent or less resulted in a higher battery capacity.

Experimental Example 2-1 to 2-94

As illustrated in Tables 2 to 7, secondary batteries were produced by the same procedure as in Experimental Examples 1-1 to 1-7, except that different types and combinations of M1 metals were used. Characteristics of each of the resulting secondary batteries were investigated. In this case, in order to perform co-deposition with powdered $SiO_y$, each powdered metal M1 was used.

TABLE 2

| Experimental example | Core portion Composition | x | Covering portion Composition | y | M1 | Proportion (at. %) | Cycle retention rate (%) | Initial efficiency (%) | Load retention rate (%) |
|---|---|---|---|---|---|---|---|---|---|
| 2-1 | $SiO_x$ | 0.1 | $SiO_y$ | 1.2 | Al | 1 | 80.0 | 80.1 | 94.0 |
| 2-2 | | | | | | 10 | 83.2 | 82.6 | 96.0 |
| 2-3 | | | | | | 20 | 83.6 | 82.9 | 97.0 |
| 2-4 | | | | | | 50 | 81.5 | 81.0 | 98.0 |
| 2-5 | | | | | | 60 | 81.0 | 80.2 | 98.0 |
| 2-6 | $SiO_x$ | 0.1 | $SiO_y$ | 1.2 | Fe | 10 | 83.6 | 83.0 | 96.0 |
| 2-7 | | | | | | 20 | 84.0 | 83.6 | 97.0 |
| 2-8 | | | | | | 50 | 82.5 | 81.5 | 98.0 |
| 2-9 | | | | | | 60 | 82.0 | 80.6 | 98.0 |

TABLE 3

| Experimental example | Core portion Composition | x | Covering portion Composition | y | M1 | Proportion (at. %) | Cycle retention rate (%) | Initial efficiency (%) | Load retention rate (%) |
|---|---|---|---|---|---|---|---|---|---|
| 2-10 | $SiO_x$ | 0.1 | $SiO_y$ | 1.2 | Cu | 10 | 81.6 | 81.2 | 96.0 |
| 2-11 | | | | | | 20 | 81.8 | 81.6 | 97.0 |
| 2-12 | | | | | | 50 | 81.0 | 81.0 | 98.0 |
| 2-13 | | | | | | 60 | 80.9 | 80.6 | 98.0 |
| 2-14 | $SiO_x$ | 0.1 | $SiO_y$ | 1.2 | C | 10 | 82.1 | 81.6 | 96.0 |
| 2-15 | | | | | | 20 | 82.5 | 81.7 | 97.0 |
| 2-16 | | | | | | 50 | 82.0 | 81.5 | 98.0 |

TABLE 3-continued

| Experimental example | Core portion Composition | x | Covering portion Composition | y | M1 | Proportion (at. %) | Cycle retention rate (%) | Initial efficiency (%) | Load retention rate (%) |
|---|---|---|---|---|---|---|---|---|---|
| 2-17 | | | | | | 60 | 81.5 | 81.3 | 98.0 |
| 2-18 | $SiO_x$ | 0.1 | $SiO_y$ | 1.2 | Mg | 10 | 81.6 | 81.5 | 96.0 |
| 2-19 | | | | | | 20 | 81.7 | 81.7 | 97.0 |
| 2-20 | | | | | | 50 | 81.0 | 81.0 | 98.0 |
| 2-21 | | | | | | 60 | 80.5 | 80.4 | 98.0 |
| 2-22 | $SiO_x$ | 0.1 | $SiO_y$ | 1.2 | Ca | 10 | 82.1 | 81.0 | 96.0 |
| 2-23 | | | | | | 20 | 82.5 | 81.5 | 97.0 |
| 2-24 | | | | | | 50 | 82.0 | 81.0 | 98.0 |
| 2-25 | | | | | | 60 | 81.6 | 80.9 | 98.0 |
| 2-26 | $SiO_x$ | 0.1 | $SiO_y$ | 1.2 | Ti | 10 | 82.5 | 81.5 | 96.0 |
| 2-27 | | | | | | 20 | 83.0 | 82.0 | 97.0 |
| 2-28 | | | | | | 50 | 82.6 | 82.0 | 98.0 |
| 2-29 | | | | | | 60 | 82.0 | 81.6 | 98.0 |

TABLE 4

| Experimental example | Core portion Composition | x | Covering portion Composition | y | M1 | Proportion (at. %) | Cycle retention rate (%) | Initial efficiency (%) | Load retention rate (%) |
|---|---|---|---|---|---|---|---|---|---|
| 2-30 | $SiO_x$ | 0.1 | $SiO_y$ | 1.2 | Cr | 10 | 82.0 | 81.0 | 96.0 |
| 2-31 | | | | | | 20 | 82.5 | 81.5 | 97.0 |
| 2-32 | | | | | | 50 | 81.6 | 81.2 | 98.0 |
| 2-33 | | | | | | 60 | 81.5 | 80.6 | 98.0 |
| 2-34 | $SiO_x$ | 0.1 | $SiO_y$ | 1.2 | Mn | 10 | 81.5 | 81.0 | 96.0 |
| 2-35 | | | | | | 20 | 81.9 | 81.5 | 97.0 |
| 2-36 | | | | | | 50 | 81.4 | 81.6 | 98.0 |
| 2-37 | | | | | | 60 | 81.2 | 81.0 | 98.0 |
| 2-38 | $SiO_x$ | 0.1 | $SiO_y$ | 1.2 | Co | 10 | 83.5 | 82.5 | 96.0 |
| 2-39 | | | | | | 20 | 83.6 | 83.0 | 97.0 |
| 2-40 | | | | | | 50 | 82.8 | 83.1 | 98.0 |
| 2-41 | | | | | | 60 | 82.1 | 82.9 | 98.0 |
| 2-42 | $SiO_x$ | 0.1 | $SiO_y$ | 1.2 | Ge | 10 | 83.0 | 82.0 | 97.0 |
| 2-43 | | | | | | 20 | 83.1 | 82.2 | 97.0 |
| 2-44 | | | | | | 50 | 83.1 | 82.1 | 98.0 |
| 2-45 | | | | | | 60 | 83.0 | 82.1 | 98.0 |
| 2-46 | $SiO_x$ | 0.1 | $SiO_y$ | 1.2 | Zr | 10 | 82.1 | 81.5 | 96.0 |
| 2-47 | | | | | | 20 | 82.5 | 81.6 | 97.0 |
| 2-48 | | | | | | 50 | 82.1 | 81.5 | 98.0 |
| 2-49 | | | | | | 60 | 81.6 | 81.3 | 98.0 |

TABLE 5

| Experimental example | Core portion Composition | x | Covering portion Composition | y | M1 | Proportion (at. %) | Cycle retention rate (%) | Initial efficiency (%) | Load retention rate (%) |
|---|---|---|---|---|---|---|---|---|---|
| 2-50 | $SiO_x$ | 0.1 | $SiO_y$ | 1.2 | Mo | 10 | 82.1 | 82.0 | 97.0 |
| 2-51 | | | | | | 20 | 82.6 | 82.1 | 97.0 |
| 2-52 | | | | | | 50 | 81.1 | 82.2 | 98.0 |
| 2-53 | | | | | | 60 | 80.5 | 82.1 | 98.0 |
| 2-54 | $SiO_x$ | 0.1 | $SiO_y$ | 1.2 | Ag | 10 | 80.6 | 81.5 | 96.0 |
| 2-55 | | | | | | 20 | 80.9 | 81.7 | 96.0 |
| 2-56 | | | | | | 50 | 80.5 | 81.5 | 97.0 |
| 2-57 | | | | | | 60 | 80.3 | 81.4 | 98.0 |
| 2-58 | $SiO_x$ | 0.1 | $SiO_y$ | 1.2 | Sn | 10 | 82.2 | 82.5 | 97.0 |
| 2-59 | | | | | | 20 | 82.3 | 82.4 | 97.0 |
| 2-60 | | | | | | 50 | 82.3 | 82.5 | 98.0 |
| 2-61 | | | | | | 60 | 82.2 | 82.5 | 98.0 |
| 2-62 | $SiO_x$ | 0.1 | $SiO_y$ | 1.2 | Ba | 10 | 80.2 | 81.5 | 96.0 |
| 2-63 | | | | | | 20 | 82.6 | 81.3 | 96.0 |
| 2-64 | | | | | | 50 | 82.6 | 81.2 | 97.0 |

TABLE 5-continued

| Experimental example | Core portion Composition | x | Covering portion Composition | y | M1 | Proportion (at. %) | Cycle retention rate (%) | Initial efficiency (%) | Load retention rate (%) |
|---|---|---|---|---|---|---|---|---|---|
| 2-65 |  |  |  |  |  | 60 | 82.5 | 81.0 | 98.0 |
| 2-66 | $SiO_x$ | 0.1 | $SiO_y$ | 1.2 | W | 10 | 81.5 | 82.0 | 96.0 |
| 2-67 |  |  |  |  |  | 20 | 81.6 | 82.1 | 97.0 |
| 2-68 |  |  |  |  |  | 50 | 81.2 | 82.0 | 98.0 |
| 2-69 |  |  |  |  |  | 60 | 81.0 | 81.8 | 98.0 |

TABLE 6

| Experimental example | Core portion Composition | x | Covering portion Composition | y | M1 | Proportion (at. %) | Cycle retention rate (%) | Initial efficiency (%) | Load retention rate (%) |
|---|---|---|---|---|---|---|---|---|---|
| 2-70 | $SiO_x$ | 0.1 | $SiO_y$ | 1.2 | Ta | 10 | 82.0 | 82.0 | 96.0 |
| 2-71 |  |  |  |  |  | 20 | 82.1 | 82.3 | 97.0 |
| 2-72 |  |  |  |  |  | 50 | 82.1 | 82.3 | 98.0 |
| 2-73 |  |  |  |  |  | 60 | 80.5 | 82.1 | 98.0 |
| 2-74 | $SiO_x$ | 0.1 | $SiO_y$ | 1.2 | Na | 10 | 81.5 | 81.5 | 96.0 |
| 2-75 |  |  |  |  |  | 20 | 81.8 | 81.6 | 96.0 |
| 2-76 |  |  |  |  |  | 50 | 81.0 | 81.5 | 97.0 |
| 2-77 |  |  |  |  |  | 60 | 81.0 | 81.3 | 98.0 |
| 2-78 | $SiO_x$ | 0.1 | $SiO_y$ | 1.2 | K | 10 | 81.2 | 81.3 | 96.0 |
| 2-79 |  |  |  |  |  | 20 | 81.6 | 81.5 | 96.0 |
| 2-80 |  |  |  |  |  | 50 | 81.2 | 81.4 | 97.0 |
| 2-81 |  |  |  |  |  | 60 | 81.0 | 81.2 | 98.0 |
| 2-82 | $SiO_x$ | 0.1 | $SiO_y$ | 1.2 | Li | 1 | 82.5 | 80.3 | 97.0 |
| 2-83 |  |  |  |  |  | 5 | 82.4 | 83.6 | 98.0 |
| 2-84 |  |  |  |  |  | 10 | 82.4 | 85.5 | 98.0 |
| 2-85 |  |  |  |  |  | 20 | 82.1 | 87.5 | 98.0 |
| 2-86 |  |  |  |  |  | 40 | 82.1 | 90.2 | 98.0 |

TABLE 7

| Experimental example | Core portion Composition | x | Covering portion Composition | y | M1 | Proportion (at. %) | Cycle retention rate (%) | Initial efficiency (%) | Load retention rate (%) |
|---|---|---|---|---|---|---|---|---|---|
| 2-87 | $SiO_x$ | 0.1 | $SiO_y$ | 1.2 | Ni + Sn | 5 + 5 | 83.2 | 84.0 | 97.0 |
| 2-88 |  |  |  |  |  | 10 + 10 | 83.3 | 84.2 | 97.0 |
| 2-89 |  |  |  |  |  | 25 + 25 | 83.4 | 84.1 | 98.0 |
| 2-90 |  |  |  |  |  | 30 + 30 | 83.0 | 84.1 | 98.0 |
| 2-91 | $SiO_x$ | 0.1 | $SiO_y$ | 1.2 | Ni + Li | 5 + 5 | 83.0 | 85.0 | 97.0 |
| 2-92 |  |  |  |  |  | 10 + 5 | 83.1 | 85.5 | 98.0 |
| 2-93 |  |  |  |  |  | 25 + 10 | 83.1 | 87.5 | 98.0 |
| 2-94 |  |  |  |  |  | 30 + 10 | 83.0 | 88.0 | 98.0 |

Even when different types and combinations of M1 metals were used, high cycle retention rates, high initial efficiency, and high load retention rates were obtained as with the results illustrated in Table 1.

Experimental Examples 3-1 to 3-7

As illustrated in Table 8, secondary batteries were produced by the same procedure as in Experimental Examples 1-1 to 1-7, except that the covering portions had different compositions (different atomic ratios y). Characteristics of each of the resulting secondary batteries were investigated. In this case, the oxygen flow rate was adjusted during the melt-solidification of the raw material (Si) to control the atomic ratio y.

TABLE 8

| Experimental example | Core portion Composition | x | Covering portion Composition | y | M1 | Proportion (at. %) | Cycle retention rate (%) | Initial efficiency (%) | Load retention rate (%) |
|---|---|---|---|---|---|---|---|---|---|
| 3-1 | SiO$_x$ | 0.1 | SiO$_y$ | 0.2 | Ni | 10 | 48.0 | 84.9 | 98.0 |
| 3-2 | | | | 0.5 | | | 76.0 | 84.5 | 98.0 |
| 3-3 | | | | 0.7 | | | 79.0 | 84.3 | 97.0 |
| 3-4 | | | | 1 | | | 81.0 | 84.0 | 97.0 |
| 3-5 | | | | 1.4 | | | 82.0 | 83.1 | 97.0 |
| 3-6 | | | | 1.8 | | | 81.0 | 82.9 | 96.0 |
| 3-7 | | | | 2 | | | 35.0 | 84.0 | 86.0 |

When the atomic ratio y was 0.5≤y≤1.5, a high cycle retention rate was obtained.

Experimental Examples 4-1 to 4-9 and 5-1 to 5-10

As illustrated in Tables 9 and 10, secondary batteries were produced by the same procedure as in Experimental Examples 1-1 to 1-7, except that the covering portions had different average coverage values and average thickness values. Characteristics of each of the resulting secondary batteries were investigated. In this case, during the formation of the covering portion, the input power and the deposition time were changed to control the average coverage, and the deposition rate and the deposition time were changed to control the average thickness.

TABLE 9

| Experimental example | Core portion Composition | x | Covering portion Composition | y | M1 | Proportion (at. %) | Average coverage (%) | Cycle retention rate (%) | Initial efficiency (%) | Load retention rate (%) |
|---|---|---|---|---|---|---|---|---|---|---|
| 4-1 | SiO$_x$ | 0.1 | SiO$_y$ | 1.2 | Ni | 10 | 10 | 76.0 | 86.0 | 95.0 |
| 4-2 | | | | | | | 20 | 78.0 | 85.6 | 95.0 |
| 4-3 | | | | | | | 30 | 81.0 | 85.2 | 96.0 |
| 4-4 | | | | | | | 40 | 82.0 | 84.5 | 96.0 |
| 4-5 | | | | | | | 50 | 83.0 | 84.2 | 96.0 |
| 4-6 | | | | | | | 60 | 83.5 | 84.0 | 96.0 |
| 4-7 | | | | | | | 80 | 84.5 | 83.0 | 97.0 |
| 4-8 | | | | | | | 90 | 85.0 | 82.5 | 97.0 |
| 4-9 | | | | | | | 100 | 85.0 | 82.0 | 98.0 |

TABLE 10

| Experimental example | Core portion Composition | x | Covering portion Composition | y | M1 | Proportion (at. %) | Average thickness (nm) | Cycle retention rate (%) | Initial efficiency (%) | Load retention rate (%) |
|---|---|---|---|---|---|---|---|---|---|---|
| 5-1 | SiO$_x$ | 0.1 | SiO$_y$ | 1.2 | Ni | 10 | 1 | 75.6 | 84.5 | 95.0 |
| 5-2 | | | | | | | 10 | 78.0 | 84.0 | 95.0 |
| 5-3 | | | | | | | 100 | 82.0 | 83.8 | 96.0 |
| 5-4 | | | | | | | 500 | 85.0 | 83.4 | 97.0 |
| 5-5 | | | | | | | 1000 | 85.5 | 82.5 | 98.0 |
| 5-6 | | | | | | | 2000 | 85.6 | 82.0 | 97.0 |
| 5-7 | | | | | | | 3000 | 85.6 | 81.5 | 97.0 |
| 5-8 | | | | | | | 5000 | 85.6 | 80.7 | 96.0 |
| 5-9 | | | | | | | 10000 | 85.7 | 80.2 | 95.0 |
| 5-10 | | | | | | | 15000 | 85.7 | 79.0 | 95.0 |

In the case where the average coverage was 30% or more and where the average thickness was in the range of 1 nm to 10,000 nm, a high cycle retention rate was obtained.

Experimental Examples 6-1 to 6-5

As illustrated in Table 11, secondary batteries were produced by the same procedure as in Experimental Examples 1-1 to 1-7, except that the covering portions had different layer structures. Characteristics of each of the resulting secondary batteries were investigated. In this case, a process for forming the covering portion was performed in two divided steps, thereby providing the multilayer covering portion. Furthermore, when the covering portion was formed, the substrate temperature during codeposition was changed, thereby controlling the bonding state in the covering portion.

When the atomic ratio x was $0 \leq x < 0.5$, the cycle retention rate and the initial efficiency were further increased.

Experimental Examples 8-1 to 8-3

As illustrated in Table 13, secondary batteries were produced by the same procedure as in Experimental Examples 1-1 to 1-7, except that the core portions were composed of different materials. Characteristics of each of the resulting secondary batteries were investigated. As the material constituting the core portion, a Sn alloy was used.

TABLE 11

| Experimental example | Core portion Composition | x | Covering portion Composition | y | M1 | Proportion (at. %) | Layer structure | Bonding state | Cycle retention rate (%) | Initial efficiency (%) | Load retention rate (%) |
|---|---|---|---|---|---|---|---|---|---|---|---|
| 6-1 | $SiO_x$ | 0.1 | $SiO_y$ | 1.2 | Ni | 10 | multilayer | SiO + Ni | 84.0 | 83.5 | 97.0 |
| 6-2 | | | | | | | single layer | SiNiO + Ni | 84.0 | 83.6 | 98.0 |
| 6-3 | | | | | | | single layer | SiO + Ni | 84.1 | 83.5 | 98.0 |
| 6-4 | | | | | | | multilayer | SiNiO + Ni | 84.1 | 83.5 | 98.0 |
| 6-5 | | | | | | | multilayer | SiNiO + Ni/ SiO + Ni | 84.0 | 83.6 | 98.0 |

The presence of the multilayer covering portion increased the cycle retention rate. Furthermore, the presence of SiNiO in the covering portion further increased the cycle retention rate.

Experimental Examples 7-1 to 7-5

As illustrated in Table 12, secondary batteries were produced by the same procedure as in Experimental Examples 1-1 to 1-7, except that the core portions had different compositions (atomic ratios x). Characteristics of each of the resulting secondary batteries were investigated. In this case, the oxygen flow rate was adjusted during the melt-solidification of the raw material (Si) to control the atomic ratio x.

TABLE 12

| Experimental example | Core portion Composition | x | Covering portion Composition | y | M1 | Proportion (at. %) | Cycle retention rate (%) | Initial efficiency (%) | Load retention rate (%) |
|---|---|---|---|---|---|---|---|---|---|
| 7-1 | $SiO_x$ | 0 | $SiO_y$ | 1.2 | Ni | 10 | 83.0 | 84.5 | 97.0 |
| 7-2 | | 0.05 | | | | | 83.5 | 84.0 | 97.0 |
| 7-3 | | 0.3 | | | | | 84.2 | 82.0 | 97.0 |
| 7-4 | | 0.5 | | | | | 84.5 | 80.0 | 97.0 |
| 7-5 | | 0.7 | | | | | 84.9 | 78.7 | 96.0 |

TABLE 13

| Experimental example | Core portion Composition | Covering portion Composition | y | M1 | Proportion (at. %) | Cycle retention rate (%) | Initial efficiency (%) | Load retention rate (%) |
|---|---|---|---|---|---|---|---|---|
| 8-1 | SnCo | $SiO_y$ | 1.2 | Ni | 10 | 83.2 | 82.0 | 95.0 |
| 8-2 | SnCoTi | | | | | 83.4 | 82.1 | 96.0 |
| 8-3 | SnFeCo | | | | | 83.4 | 82.0 | 96.0 |

Even when the core portion was composed of elemental Sn or the Sn alloy, a high cycle retention rate, high initial efficiency, and a high load retention rate were obtained.

Experimental Examples 9-1 to 9-14

As illustrated in Table 14, secondary batteries were produced by the same procedure as in Experimental Examples 1-1 to 1-7, except that element M2 (e.g., Fe) was incorporated into each core portion. Characteristics of each of the resulting secondary batteries were investigated. In this case, the core portion was formed by a gas atomization method using powdered $SiO_x$ and powdered metal M2 (e.g., Al) as raw materials.

TABLE 14

| Experimental example | Core portion Composition | x | M2 | Proportion (at. %) | Covering portion Composition | y | M1 | Proportion (at. %) | Cycle retention rate (%) | Initial efficiency (%) | Load retention rate (%) |
|---|---|---|---|---|---|---|---|---|---|---|---|
| 9-1 | $SiO_x$ | 0.1 | Al | 0.01 | $SiO_y$ | 1.2 | Ni | 10 | 84.2 | 83.6 | 97.0 |
| 9-2 | | | | 0.1 | | | | | 84.3 | 83.5 | 97.0 |
| 9-3 | | | | 1 | | | | | 84.6 | 83.5 | 98.0 |
| 9-4 | | | | 10 | | | | | 85.0 | 83.5 | 98.0 |
| 9-5 | | | | 30 | | | | | 85.2 | 83.4 | 98.0 |
| 9-6 | | | | 50 | | | | | 85.6 | 83.4 | 98.0 |
| 9-7 | | | | 60 | | | | | 85.6 | 83.3 | 98.0 |
| 9-8 | $SiO_x$ | 0.1 | Fe | 0.01 | $SiO_y$ | 1.2 | Ni | 10 | 84.5 | 83.8 | 97.0 |
| 9-9 | | | | 0.1 | | | | | 84.6 | 83.7 | 97.0 |
| 9-10 | | | | 1 | | | | | 84.8 | 83.5 | 98.0 |
| 9-11 | | | | 10 | | | | | 85.0 | 83.5 | 98.0 |
| 9-12 | | | | 30 | | | | | 85.3 | 84.0 | 98.0 |
| 9-13 | | | | 50 | | | | | 85.3 | 84.0 | 98.0 |
| 9-14 | | | | 60 | | | | | 85.4 | 83.6 | 98.0 |

The incorporation of M2 into the core portion resulted in a further increase in cycle retention rate. In this case, an M2 ratio of 0.01 atomic percent to 50 atomic percent resulted in a higher battery capacity.

Experimental Examples 10-1 to 10-60

As illustrated in Tables 15 to 17, secondary batteries were produced by the same procedure as in Experimental Examples 1-1 to 1-7, except that element M3 (e.g., Cr) or element M4 (e.g., B) was incorporated into each core portion. Characteristics of each of the resulting secondary batteries were investigated. In this case, the core portion was formed by a gas atomization method using powdered $SiO_x$ and, for example, powdered metal M3 (Cr or the like) as raw materials.

TABLE 15

| Experimental example | Core portion (M3, M4) | Covering portion Composition | y | M1 | Proportion (at. %) | Cycle retention rate (%) | Initial efficiency (%) | Load retention rate (%) |
|---|---|---|---|---|---|---|---|---|
| 10-1 | $Si_{50}Al_{49}Cr_1$ | $SiO_y$ | 1.2 | Ni | 10 | 86.1 | 83.8 | 98.0 |
| 10-2 | $Si_{50}Al_{49}Ni_1$ | | | | | 86.0 | 83.7 | 97.0 |
| 10-3 | $Si_{50}Al_{49}Fe_1$ | | | | | 86.2 | 83.5 | 98.0 |
| 10-4 | $Si_{40}Al_{41}Cr_{19}$ | | | | | 86.3 | 83.5 | 97.0 |
| 10-5 | $Si_{40}Al_{41}Ni_{19}$ | | | | | 86.2 | 83.6 | 98.0 |
| 10-6 | $Si_{40}Al_{41}Fe_{19}$ | | | | | 86.4 | 83.5 | 97.0 |
| 10-7 | $Si_{35}Al_{46}Cr_{19}$ | | | | | 86.3 | 83.5 | 97.0 |
| 10-8 | $Si_{35}Al_{46}Ni_{19}$ | | | | | 86.2 | 83.5 | 97.0 |
| 10-9 | $Si_{35}Al_{46}Fe_{19}$ | | | | | 86.2 | 83.4 | 97.0 |
| 10-10 | $Si_{30}Al_{20}Cr_{50}$ | | | | | 86.1 | 83.4 | 97.0 |
| 10-11 | $Si_{30}Al_{20}Ni_{50}$ | | | | | 86.4 | 83.3 | 97.0 |
| 10-12 | $Si_{30}Al_{20}Fe_{50}$ | | | | | 86.2 | 83.5 | 98.0 |
| 10-13 | $Si_{30}Al_{10}Cr_{60}$ | | | | | 86.1 | 83.6 | 97.0 |
| 10-14 | $Si_{30}Al_{10}Ni_{60}$ | | | | | 86.0 | 83.5 | 98.0 |
| 10-15 | $Si_{30}Al_{10}Fe_{60}$ | | | | | 86.2 | 83.5 | 97.0 |
| 10-16 | $Si_{30}Al_{47.5}Cr_{22.49}Cu_{0.01}$ | | | | | 86.3 | 83.5 | 97.0 |
| 10-17 | $Si_{30}Al_{47.5}Ni_{22.49}Cu_{0.01}$ | | | | | 86.2 | 83.7 | 98.0 |
| 10-18 | $Si_{30}Al_{47.5}Fe_{22.49}Cu_{0.01}$ | | | | | 86.4 | 83.5 | 97.0 |
| 10-19 | $Si_{30}Al_{47.5}Cr_{12.5}Cu_{10}$ | | | | | 86.3 | 83.5 | 97.0 |
| 10-20 | $Si_{30}Al_{47.5}Ni_{12.5}Cu_{10}$ | | | | | 86.2 | 83.6 | 97.0 |
| 10-21 | $Si_{30}Al_{47.5}Fe_{12.5}Cu_{10}$ | | | | | 86.2 | 83.5 | 97.0 |
| 10-22 | $Si_{30}Al_{25}Cr_{25}Cu_{20}$ | | | | | 86.2 | 83.5 | 97.0 |
| 10-23 | $Si_{30}Al_{25}Ni_{25}Cu_{20}$ | | | | | 86.1 | 83.5 | 97.0 |
| 10-24 | $Si_{30}Al_{25}Fe_{25}Cu_{20}$ | | | | | 86.4 | 83.4 | 98.0 |
| 10-25 | $Si_{30}Al_{20}Cr_{30}Cu_{20}$ | | | | | 86.2 | 83.4 | 97.0 |
| 10-26 | $Si_{30}Al_{20}Ni_{30}Cu_{20}$ | | | | | 86.1 | 83.3 | 98.0 |
| 10-27 | $Si_{30}Al_{20}Fe_{30}Cu_{20}$ | | | | | 86.0 | 83.5 | 97.0 |

TABLE 16

| Experimental example | Core portion (M3, M4) | Covering portion Composition | y | M1 | Proportion (at. %) | Cycle retention rate (%) | Initial efficiency (%) | Load retention rate (%) |
|---|---|---|---|---|---|---|---|---|
| 10-28 | $Si_{30}Al_{27.5}Cr_{12.5}Cu_{30}$ | $SiO_y$ | 1.2 | Ni | 10 | 86.2 | 83.5 | 97.0 |
| 10-29 | $Si_{30}Al_{27.5}Ni_{12.5}Cu_{30}$ | | | | | 86.3 | 83.4 | 98.0 |
| 10-30 | $Si_{30}Al_{27.5}Fe_{12.5}Cu_{30}$ | | | | | 86.2 | 83.4 | 97.0 |
| 10-31 | $Si_{30}Al_{20}Cr_{12.5}Cu_{37.5}$ | | | | | 86.3 | 83.3 | 97.0 |
| 10-32 | $Si_{30}Al_{20}Ni_{12.5}Cu_{37.5}$ | | | | | 86.2 | 83.5 | 97.0 |
| 10-33 | $Si_{30}Al_{20}Fe_{12.5}Cu_{37.5}$ | | | | | 86.4 | 83.6 | 97.0 |
| 10-34 | $Si_{30}Al_{47.5}Cr_{12.5}B_{10}$ | | | | | 86.3 | 83.5 | 97.0 |
| 10-35 | $Si_{30}Al_{47.5}Cr_{12.5}Mg_{10}$ | | | | | 86.2 | 83.5 | 97.0 |
| 10-36 | $Si_{30}Al_{47.5}Cr_{12.5}Ca_{10}$ | | | | | 86.2 | 83.5 | 97.0 |
| 10-37 | $Si_{30}Al_{47.5}Cr_{12.5}Ti_{10}$ | | | | | 86.2 | 83.7 | 97.0 |
| 10-38 | $Si_{30}Al_{47.5}Cr_{12.5}V_{10}$ | | | | | 86.4 | 83.5 | 98.0 |
| 10-39 | $Si_{30}Al_{47.5}Cr_{12.5}Mn_{10}$ | | | | | 86.2 | 83.5 | 97.0 |
| 10-40 | $Si_{30}Al_{47.5}Cr_{12.5}Co_{10}$ | | | | | 86.1 | 83.6 | 98.0 |
| 10-41 | $Si_{30}Al_{47.5}Cr_{12.5}Ge_{10}$ | | | | | 86.0 | 83.5 | 97.0 |
| 10-42 | $Si_{30}Al_{47.5}Cr_{12.5}Y_{10}$ | | | | | 86.2 | 83.5 | 97.0 |
| 10-43 | $Si_{30}Al_{47.5}Cr_{12.5}Zr_{10}$ | | | | | 86.3 | 83.4 | 98.0 |
| 10-44 | $Si_{30}Al_{47.5}Cr_{12.5}Mo_{10}$ | | | | | 86.2 | 83.4 | 97.0 |
| 10-45 | $Si_{30}Al_{47.5}Cr_{12.5}Ag_{10}$ | | | | | 86.3 | 83.3 | 97.0 |
| 10-46 | $Si_{30}Al_{47.5}Cr_{12.5}In_{10}$ | | | | | 86.4 | 83.5 | 97.0 |
| 10-47 | $Si_{30}Al_{47.5}Cr_{12.5}Sn_{10}$ | | | | | 86.3 | 83.5 | 98.0 |
| 10-48 | $Si_{30}Al_{47.5}Cr_{12.5}Sb_{10}$ | | | | | 86.2 | 83.4 | 97.0 |
| 10-49 | $Si_{30}Al_{47.5}Cr_{12.5}Ta_{10}$ | | | | | 86.2 | 83.4 | 98.0 |
| 10-50 | $Si_{30}Al_{47.5}Cr_{12.5}W_{10}$ | | | | | 86.3 | 83.3 | 97.0 |
| 10-51 | $Si_{30}Al_{47.5}Cr_{12.5}Pb_{10}$ | | | | | 86.4 | 83.5 | 97.0 |
| 10-52 | $Si_{30}Al_{47.5}Cr_{12.5}La_{10}$ | | | | | 86.2 | 83.5 | 98.0 |
| 10-53 | $Si_{30}Al_{47.5}Cr_{12.5}Ce_{10}$ | | | | | 86.1 | 83.5 | 97.0 |
| 10-54 | $Si_{30}Al_{47.5}Cr_{12.5}Pr_{10}$ | | | | | 86.4 | 83.7 | 98.0 |
| 10-55 | $Si_{30}Al_{47.5}Cr_{12.5}Nd_{10}$ | | | | | 86.2 | 83.5 | 97.0 |

TABLE 17

| Experimental example | Core portion (M3, M4) | Covering portion Composition | y | M1 | Proportion (at. %) | Cycle retention rate (%) | Initial efficiency (%) | Load retention rate (%) |
|---|---|---|---|---|---|---|---|---|
| 10-56 | $Si_{10}Al_{47.5}Cr_{12.5}Cu_{30}$ | $SiO_y$ | 1.2 | Ni | 10 | 86.4 | 83.5 | 98.0 |
| 10-57 | $Si_{20}Al_{47.5}Cr_{7.5}Cu_5$ | | | | | 86.2 | 83.6 | 97.0 |
| 10-58 | $Si_{80}Al_{10}Cr_5Cu_5$ | | | | | 86.1 | 83.5 | 97.0 |
| 10-59 | $Si_{85}Al_5Cr_5Cu_5$ | | | | | 86.0 | 83.3 | 98.0 |
| 10-60 | $Si_{30}Al_{47.5}Cr_{12.5}Cu_{10}$ | | | | | 86.2 | 83.3 | 97.0 |

The incorporation of M3 or M4 into the core portion resulted in a further increase in cycle retention rate. In this case, when the M3 ratio was in the range of 1 atomic percent to 50 atomic percent and when the M4 ratio was in the range of 0.01 atomic percent to 30 atomic percent, a higher battery capacity was obtained.

Experimental Examples 11-1 to 11-8

As illustrated in Table 18, secondary batteries were produced by the same procedure as in Experimental Examples 1-1 to 1-7, except that a conductive portion was formed on the surface of each core portion. Characteristics of each of the resulting secondary batteries were investigated. In this case, each conductive portion was formed by the same procedure as the procedure for forming the covering portion. The average thickness and the average coverage of each conductive portion are described in Table 18.

TABLE 18

| Experimental example | Core portion Composition | x | Covering portion Composition | y | M1 | Proportion (at. %) | Conductive portion Type | Average thickness (nm) | Average coverage (%) | Cycle retention rate (%) | Initial efficiency (%) | Load retention rate (%) |
|---|---|---|---|---|---|---|---|---|---|---|---|---|
| 11-1 | $SiO_x$ | 0.1 | $SiO_y$ | 1.2 | Ni | 10 | C | 100 | 5 | 84.0 | 83.6 | 97.0 |
| 11-2 | | | | | | | | | 10 | 84.0 | 83.6 | 98.0 |
| 11-3 | | | | | | | | | 15 | 84.1 | 83.6 | 98.0 |
| 11-4 | | | | | | | | | 30 | 84.1 | 83.7 | 98.0 |
| 11-5 | | | | | | | | | 50 | 84.1 | 83.7 | 99.0 |
| 11-6 | | | | | | | | | 70 | 84.1 | 83.7 | 99.0 |
| 11-7 | | | | | | | | | 90 | 84.1 | 83.8 | 99.0 |
| 11-8 | | | | | | | | | 99 | 84.2 | 83.8 | 99.0 |

The formation of the conductive portion provided better results.

Experimental Examples 12-1 to 12-6

As illustrated in Table 19, secondary batteries were produced by the same procedure as in Experimental Examples 1-1 to 1-7, except that the core portions had different median diameters. Characteristics of each of the resulting secondary batteries were investigated.

TABLE 19

| Experimental example | Core portion Composition | x | Median diameter (nm) | Covering portion Composition | y | M1 | Proportion (at. %) | Cycle retention rate (%) | Initial efficiency (%) | Load retention rate (%) |
|---|---|---|---|---|---|---|---|---|---|---|
| 12-1 | SiO$_x$ | 0.1 | 0.1 | SiO$_y$ | 1.2 | Ni | 10 | 82.6 | 79.2 | 97.0 |
| 12-2 | | | 0.3 | | | | | 83.0 | 80.5 | 97.0 |
| 12-3 | | | 1 | | | | | 83.3 | 82.3 | 97.0 |
| 12-4 | | | 10 | | | | | 82.0 | 84.5 | 98.0 |
| 12-5 | | | 20 | | | | | 81.0 | 83.0 | 98.0 |
| 12-6 | | | 30 | | | | | 76.0 | 79.0 | 96.0 |

A median diameter of the core portion of 0.3 μm to 20 μm resulted in a high cycle retention rate, high initial efficiency, and a high battery capacity.

Experimental Examples 13-1 to 13-18

As illustrated in Table 20, secondary batteries were produced by the same procedure as in Experimental Examples 1-1 to 1-7, except that different negative-electrode binders were used. Characteristics of each of the resulting secondary batteries were investigated. In this case, as the negative-electrode binders, polyimide (PI), polyvinylidene fluoride (PVDF), polyamide (PA), polyacrylic acid (PAA), lithium polyacrylate (PAAL), and carbonized polyimide (carbonized PI) were used. In the case where PAA or PAAL was used, a slurry of a negative-electrode mixture was prepared with an aqueous solution containing 17% by volume PAA or PAAL. Hot-pressing was performed to form the negative-electrode active material layers 54B without baking.

Even when different negative-electrode binders were used, high cycle retention rates, high initial efficiency, and high load retention rates were obtained.

Experimental Examples 14-1 to 14-12

As illustrated in Table 21, secondary batteries were produced by the same procedure as in Experimental Examples 1-1 to 1-7, except that different positive-electrode active materials were used. Characteristics of each of the resulting secondary batteries were investigated.

TABLE 20

| Experimental example | Core portion Type | x | Covering portion Type | y | M1 | Proportion (at. %) | Negative-electrode binder | Cycle retention rate (%) | Initial efficiency (%) | Load retention rate (%) |
|---|---|---|---|---|---|---|---|---|---|---|
| 13-1 | SiO$_x$ | 0.1 | SiO$_y$ | 1.2 | Ni | 10 | PI | 83.5 | 83.4 | 97.0 |
| 13-2 | | | | | | 20 | | 84.6 | 83.5 | 97.0 |
| 13-3 | | | | | | 50 | | 83.3 | 82.1 | 97.0 |
| 13-4 | SiO$_x$ | 0.1 | SiO$_y$ | 1.2 | Ni | 10 | PVDF | 82.8 | 83.1 | 97.0 |
| 13-5 | | | | | | 20 | | 84.0 | 83.3 | 97.0 |
| 13-6 | | | | | | 50 | | 83.0 | 83.0 | 97.0 |
| 13-7 | SiO$_x$ | 0.1 | SiO$_y$ | 1.2 | Ni | 10 | PA | 83.0 | 83.0 | 97.0 |
| 13-8 | | | | | | 20 | | 84.0 | 83.5 | 97.0 |
| 13-9 | | | | | | 50 | | 83.0 | 83.1 | 97.0 |
| 13-10 | SiO$_x$ | 0.1 | SiO$_y$ | 1.2 | Ni | 10 | PAA | 82.6 | 83.1 | 97.0 |
| 13-11 | | | | | | 20 | | 83.1 | 83.3 | 97.0 |
| 13-12 | | | | | | 50 | | 82.8 | 83.3 | 97.0 |
| 13-13 | SiO$_x$ | 0.1 | SiO$_y$ | 1.2 | Ni | 10 | PAAL | 83.5 | 84.1 | 97.0 |
| 13-14 | | | | | | 20 | | 84.2 | 84.2 | 97.0 |
| 13-15 | | | | | | 50 | | 83.5 | 84.1 | 97.0 |
| 13-16 | SiO$_x$ | 0.1 | SiO$_y$ | 1.2 | Ni | 10 | carbonized PI | 83.6 | 84.5 | 97.0 |
| 13-17 | | | | | | 20 | | 84.5 | 84.6 | 97.0 |
| 13-18 | | | | | | 50 | | 83.9 | 84.4 | 97.0 |

TABLE 21

| Experimental example | Core portion Type | x | Covering portion Type | y | M1 | Proportion (at. %) | Positive electrode active material | Cycle retention rate (%) | Initial efficiency (%) | Load retention rate (%) |
|---|---|---|---|---|---|---|---|---|---|---|
| 14-1 | $SiO_x$ | 0.1 | $SiO_y$ | 1.2 | Ni | 10 | $LiNi_{0.70}Co_{0.25}Al_{0.05}O_2$ | 84.1 | 83.5 | 97.0 |
| 14-2 | | | | | | | $LiNi_{0.79}Co_{0.14}Al_{0.07}O_2$ | 84.0 | 83.6 | 97.0 |
| 14-3 | | | | | | | $LiNi_{0.70}Co_{0.25}Mg_{0.05}O_2$ | 84.2 | 83.7 | 97.0 |
| 14-4 | | | | | | | $LiNi_{0.70}Co_{0.25}Fe_{0.05}O_2$ | 84.1 | 83.6 | 97.0 |
| 14-5 | | | | | | | $LiNiO_2$ | 84.1 | 83.7 | 97.0 |
| 14-6 | | | | | | | $LiNi_{0.33}Co_{0.33}Mn_{0.33}O_2$ | 84.2 | 83.6 | 97.0 |
| 14-7 | | | | | | | $LiNi_{0.13}Co_{0.60}Mn_{0.27}O_2$ | 84.1 | 83.7 | 97.0 |
| 14-8 | | | | | | | $Li_{1.13}[Ni_{0.22}Co_{0.18}Mn_{0.60}]_{0.87}O_2$ | 84.2 | 83.5 | 97.0 |
| 14-9 | | | | | | | $Li_{1.13}[Ni_{0.20}Co_{0.20}Mn_{0.60}]_{0.87}O_2$ | 84.0 | 83.6 | 97.0 |
| 14-10 | | | | | | | $Li_{1.13}[Ni_{0.18}Co_{0.22}Mn_{0.60}]_{0.87}O_2$ | 84.2 | 83.6 | 97.0 |
| 14-11 | | | | | | | $Li_{1.13}[Ni_{0.25}Co_{0.25}Mn_{0.50}]_{0.87}O_2$ | 84.2 | 83.5 | 97.0 |
| 14-12 | | | | | | | $Li_2Ni_{0.40}Cu_{0.60}O_2$ | 84.1 | 83.7 | 97.0 |

Even when different positive-electrode active materials were used, high cycle retention rates, high initial efficiency, and high load retention rates were obtained.

The results illustrated in Tables 1 to 21 demonstrated that when the negative-electrode active material included the covering portion having a predetermined composition on the surface of the core portion, high cycle characteristics, high initial charge-discharge characteristics, and high load characteristics were obtained.

While the present application has been described above with reference to the embodiments and examples, the present application is not limited to these embodiments and examples. Various modifications may be made. For example, while the capacity of the negative electrode has been represented on the basis of the occlusion and release of lithium ions in the above-described embodiments, the present application is not necessarily limited thereto. The present application is also applicable to the case where the capacity of a negative electrode includes a capacity on the basis of the occlusion and release of lithium ions and a capacity on the basis of the deposition and dissolution of metallic Li, and is expressed as the sum of the capacities. In this case, as the negative-electrode active material, a negative-electrode material capable of occluding and releasing lithium ions is used, and the chargeable capacity of the negative-electrode material is set to be higher than the discharge capacity of the positive electrode.

While the case where the battery has a prismatic shape, a cylindrical shape, or a laminated-film shape and where the battery element has a spirally wound structure has been described above, the present application is not necessarily limited thereto. The present application is also applicable to a battery having a prismatic shape, a button shape, or the like, or to a battery element having a laminated structure.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery comprising:
 a positive electrode;
 a negative electrode including a first negative electrode active material; and
 an electrolytic solution,
 wherein the first negative electrode active material includes:
  a core portion having a core portion surface, wherein the core portion has a median diameter of 0.3 μm to 20 μm, and
  a covering portion that covers at least part of the core portion surface,
 wherein the covering portion comprises at least Si, O and at least of one element M1 selected from Li, carbon (C), Mg, Al, Ca, Ti, Cr, Mn, Fe, Co, Ni, Cu, Ge, Zr, Mo, Ag, Sn, Ba, W, Ta, Na, and K.

2. The battery according to claim 1, wherein the covering portion covers from 30% to 100% of the core portion surface.

3. The battery according to claim 1, wherein the covering portion has a thickness of 1 nm to 10,000 nm.

4. The battery according to claim 1, wherein the covering portion has a multilayer structure.

5. The battery according to claim 1, wherein the first negative electrode active material includes a conductive portion that covers at least part of a surface of the covering portion, and wherein the conductive portion has a lower electrical resistance than any one of the core portion and the covering portion.

6. The battery according to claim 1, wherein the negative electrode further includes a second negative electrode active material.

7. The battery according to claim 6, wherein the second negative electrode active material includes a carbon material.

8. The battery according to claim 7, wherein the core portion includes carbon.

9. The battery according to claim 8, wherein the element M1 is carbon.

10. The battery according to claim 9, wherein the positive electrode includes lithium cobalt oxide.

11. The battery according to claim 1, wherein an atomic ratio y (O/Si) of O to Si in the covering portion is $0.5 \leq y \leq 1.8$.

12. The battery according to claim 1, wherein the core portion includes at least one of Si and Sn.

13. The battery according to claim 7, wherein the electrolytic solution includes a nonaqueous solvent comprising at least one selected from the group consisting of a halogenated chain carbonate and a halogenated cyclic carbonate.

14. The battery according to claim 13, wherein the halogenated cyclic carbonate comprises at least one selected from the group consisting of 4-fluoro-1,3-dioxolan-2-one and 4,5-difluoro-1,3-dioxolan-2-one.

15. The battery according to claim 13, wherein an amount of the at least one selected from the group consisting of the halogenated chain carbonate and the halogenated cyclic carbonate ranges from 0.01% by weight to 50% by weight of the nonaqueous solvent.

16. The battery according to claim 7, wherein the negative electrode includes a negative electrode collector comprising at least one selected from the group consisting of carbon and sulfur.

17. The battery according to claim 16, wherein a content of the at least one selected from the group consisting of carbon and sulfur in the negative electrode collector is 100 ppm or less.

18. An electric tool comprising:
a battery including a positive electrode, a negative electrode including a negative electrode active material, and an electrolytic solution; and
a moving part configured to be powered by the battery,
wherein the negative electrode active material includes:
a core portion having a core portion surface, wherein the core portion has a median diameter of 0.3 μm to 20 μm, and
a covering portion that covers at least part of the core portion surface,
wherein the covering portion comprises at least Si, O and at least of one element M1 selected from Li, carbon (C), Mg, Al, Ca, Ti, Cr, Mn, Fe, Co, Ni, Cu, Ge, Zr, Mo, Ag, Sn, Ba, W, Ta, Na, and K.

19. A negative electrode active material comprising:
a core portion having a core portion surface, wherein the core portion has a median diameter of 0.3 μm to 20 μm, and
a covering portion that covers at least a part of the core portion surface,
wherein the covering portion comprises at least Si and O and at least of one element M1 selected from Li, carbon (C), Mg, Al, Ca, Ti, Cr, Mn, Fe, Co, Ni, Cu, Ge, Zr, Mo, Ag, Sn, Ba, W, Ta, Na, and K.

20. The negative electrode active material according to claim 19, wherein the covering portion covers from 30% to 100% of the core portion surface.

21. The negative electrode active material according to claim 19, wherein the covering portion has a thickness of 1 nm to 10,000 nm.

22. The negative electrode active material according to claim 19, wherein the covering portion has a multilayer structure.

23. The negative electrode active material according to claim 19, further comprising a conductive portion that covers at least part of a surface of the covering portion, wherein the conductive portion has a lower electrical resistance than any one of the core portion and the covering portion.

24. The negative electrode active material according to claim 19, wherein the element M1 is carbon.

25. The negative electrode active material according to claim 19, wherein an atomic ratio y (O/Si) of O to Si is $0.5 \leq y \leq 1.8$.

26. The negative electrode active material according to claim 19, wherein the core portion includes at least one of Si and Sn.

27. The negative electrode active material according to claim 19, wherein the core portion includes carbon.

* * * * *